(12) United States Patent
Kikuchi et al.

(10) Patent No.: US 12,187,263 B2
(45) Date of Patent: Jan. 7, 2025

(54) VEHICLE CONTROL APPARATUS

(71) Applicant: SUBARU CORPORATION, Tokyo (JP)

(72) Inventors: Jun Kikuchi, Tokyo (JP); Mami Osawa, Tokyo (JP); Daichi Akiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 280 days.

(21) Appl. No.: 17/707,549

(22) Filed: Mar. 29, 2022

(65) Prior Publication Data

US 2022/0324431 A1 Oct. 13, 2022

(30) Foreign Application Priority Data

Apr. 7, 2021 (JP) ................. 2021-065362

(51) Int. Cl.
*B60W 20/13* (2016.01)
*B60L 53/14* (2019.01)

(52) U.S. Cl.
CPC ............ *B60W 20/13* (2016.01); *B60L 53/14* (2019.02); *B60W 2510/244* (2013.01); *B60W 2510/248* (2013.01)

(58) Field of Classification Search
None
See application file for complete search history.

(56) References Cited

U.S. PATENT DOCUMENTS

2013/0138369 A1 5/2013 Papana et al.
2019/0198945 A1* 6/2019 Machida ............... H02J 7/0016
2019/0288344 A1 9/2019 Nakao et al.
2020/0122577 A1* 4/2020 Kubo ................... G07C 5/0825
2021/0398365 A1* 12/2021 Kurimoto ............ G07C 5/0825
2022/0308117 A1* 9/2022 Sugo ......................... H02J 7/02

FOREIGN PATENT DOCUMENTS

| JP | 2008-96166 A | 4/2008 |
|---|---|---|
| JP | 2011-215125 A | 10/2011 |
| JP | 2013-122450 A | 6/2013 |
| WO | 2017/199629 A | 11/2017 |

OTHER PUBLICATIONS

Jiang et al., "Modeling charge polarization voltage for large lithium-ion batteries in electric vehicles", Journal of Industrial Engineering and Management, 2013, pp. 686-697 (Year: 2013).*

* cited by examiner

*Primary Examiner* — Tamara L Weber
(74) *Attorney, Agent, or Firm* — Rimon P.C.

(57) ABSTRACT

A vehicle control apparatus includes a control system. The control system includes a processor and a memory that are communicably coupled to each other, and executes a polarization eliminating mode in which polarization is eliminated by controlling an energization state of an electric power storage device while a vehicle is traveling. The control system sets a first necessary time to eliminate the polarization based on a polarization state of the electric power storage device, acquires a second necessary time to an arrival of the vehicle at a destination, permits the polarization eliminating mode to be executed while the vehicle is traveling in a case where the first necessary time is shorter than or equal to the second necessary time, and refrains from permitting the polarization eliminating mode to be executed while the vehicle is traveling in a case where the first necessary time is longer than the second necessary time.

13 Claims, 20 Drawing Sheets

VEHICLE CONTROL APPARATUS

CROSS-REFERENCE TO RELATED APPLICATIONS

The present application claims priority from Japanese Patent Application No. 2021-065362 filed on Apr. 7, 2021, the entire contents of which are hereby incorporated by reference.

BACKGROUND

The technology relates to a vehicle control apparatus.

Vehicles such as hybrid vehicles include electric power storage devices such as lithium-ion batteries. A vehicle including an electric power storage device calculates, for example, a state of charge (SOC) of the electric power storage device on the basis of a terminal voltage of the electric power storage device. References are made to Japanese Unexamined Patent Application Publication (JP-A) Nos. 2013-122450, 2011-215125, and 2008-96166, and International Publication No. WO 2017/199629.

SUMMARY

An aspect of the technology provides a vehicle control apparatus including a control system. The control system includes a processor and a memory that are communicably coupled to each other, and is configured to execute a polarization eliminating mode in which polarization of an electric power storage device is eliminated by controlling an energization state of the electric power storage device while a vehicle is traveling. The control system is configured to set a first necessary time to eliminate the polarization on the basis of a state of the polarization of the electric power storage device, acquire a second necessary time to an arrival of the vehicle at a destination, permit the polarization eliminating mode to be executed while the vehicle is traveling in a case where the first necessary time is shorter than or equal to the second necessary time, and refrain from permitting the polarization eliminating mode to be executed while the vehicle is traveling in a case where the first necessary time is longer than the second necessary time.

An aspect of the technology provides a vehicle control apparatus including circuitry. The circuitry is configured to execute a polarization eliminating mode in which polarization of an electric power storage device is eliminated by controlling an energization state of the electric power storage device while a vehicle is traveling. The circuitry is configured to set a first necessary time to eliminate the polarization on the basis of a state of the polarization of the electric power storage device, acquire a second necessary time to an arrival of the vehicle at a destination, permit the polarization eliminating mode to be executed while the vehicle is traveling in a case where the first necessary time is shorter than or equal to the second necessary time, and refrain from permitting the polarization eliminating mode to be executed while the vehicle is traveling in a case where the first necessary time is longer than the second necessary time.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
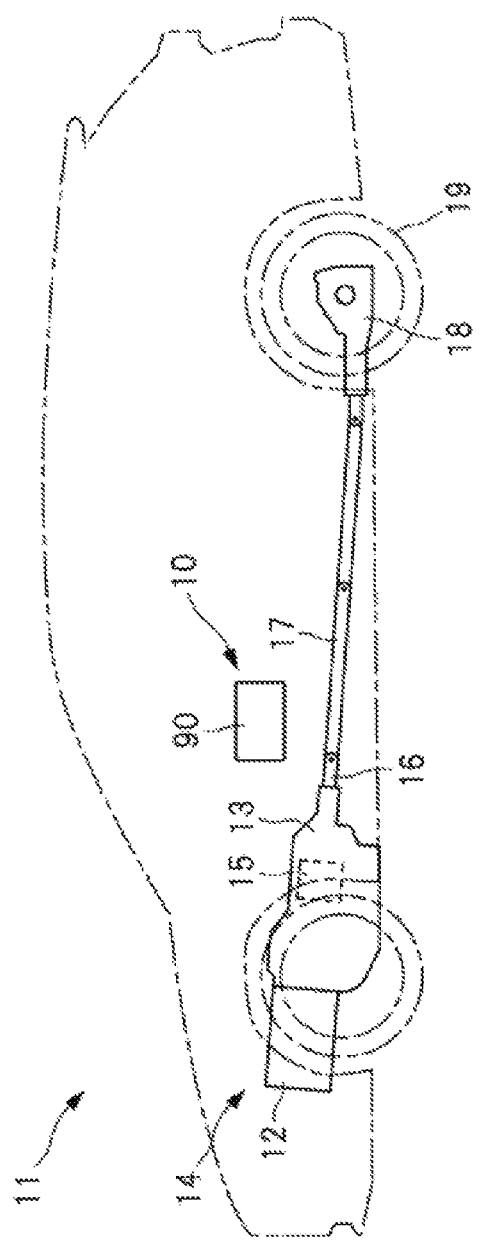
FIG. 1 is a diagram illustrating a configuration example of a vehicle including a vehicle control apparatus according to one example embodiment of the technology.

An electric power storage device causes polarization at the time of charging or discharging of the electric power storage device. This can cause a terminal voltage to deviate from an open circuit voltage. Accordingly, to calculate a state, such as a state of charge (SOC), of the electric power storage device on the basis of the terminal voltage with high accuracy, it has been necessary to wait for an electrochemical equilibrium state of the electric power storage device in which the terminal voltage approaches the open circuit voltage. However, it often takes a long time until the electric power storage device is brought into the electrochemical equilibrium state, which makes it difficult to perform control of various types, such as calculation of the SOC, using the terminal voltage, immediately after the vehicle is stopped. Accordingly, it is desirable to eliminate the polarization of the electric power storage device while the vehicle is traveling.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

[Overall Configuration]

FIG. 1 illustrates a configuration example of a vehicle 11 including a vehicle control apparatus 10 according to one example embodiment of the technology. As illustrated in FIG. 1, the vehicle 11 may include a power train 14. The power train 14 may include an engine 12 and a transmission 13. The vehicle 11 illustrated in FIG. 1 may be a hybrid vehicle. The transmission 13 may include a motor generator 15 as a power source. The transmission 13 may also be provided with an output shaft 16 coupled to wheels 19 via a propeller shaft 17 and a differential mechanism 18. Although the power train 14 illustrated in the drawings may be a power train for driving rear wheels, the power train 14 should not be limited to this example. The power train 14 may be a power train for driving front wheels or a power train for driving all of the wheels.

Figure 2:
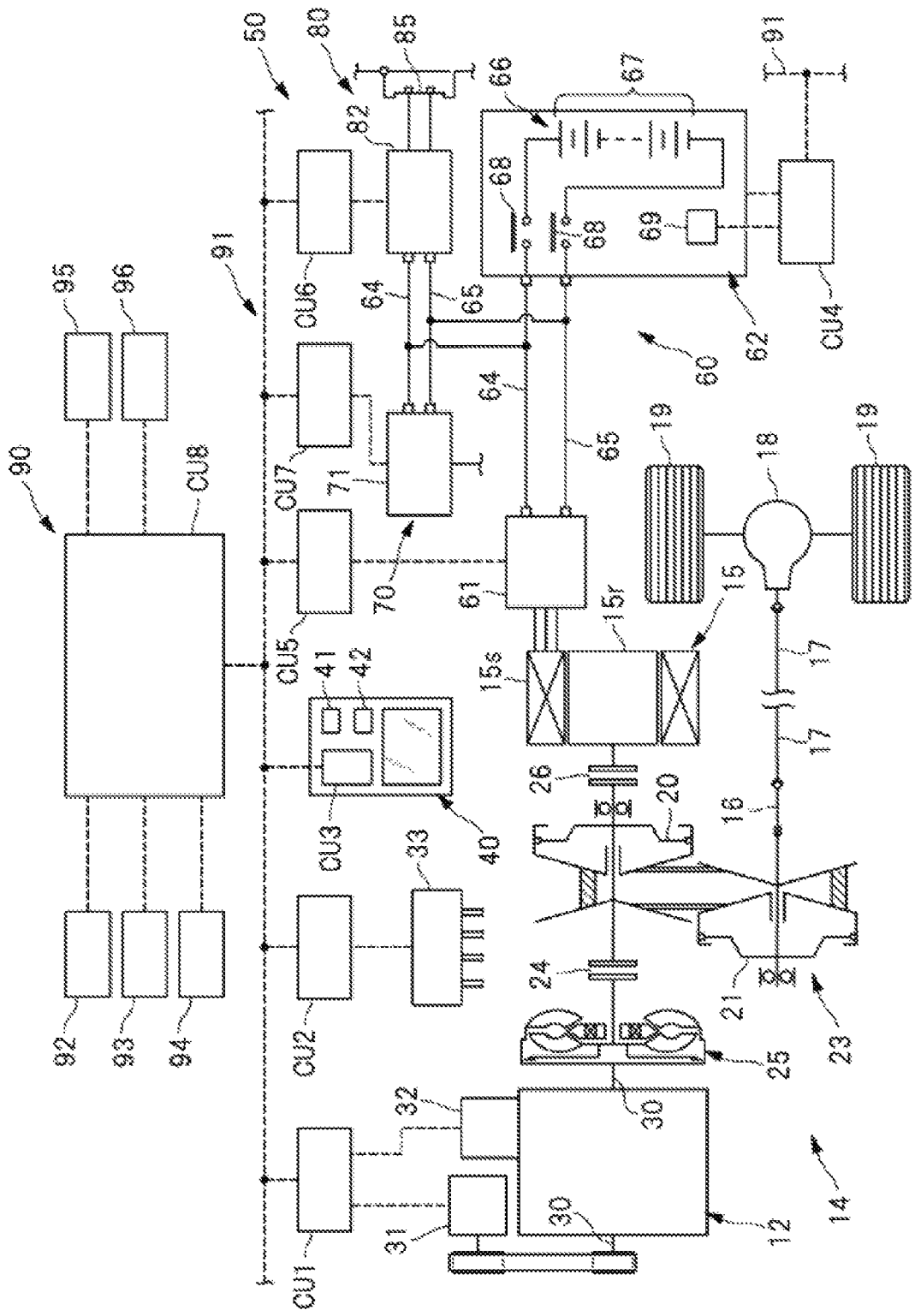
FIG. 2 is a diagram illustrating an configuration example of the vehicle control apparatus.

FIG. 2 illustrates a configuration example of the vehicle control apparatus 10. As illustrated in FIG. 2, the power train 14 may include a continuously variable transmission mechanism 23. The continuously variable transmission mechanism 23 may include a primary pulley 20 and a secondary pulley 21. The engine 12 may be coupled to one side of the primary pulley 20 via a forward clutch 24 and a torque converter 25. The motor generator 15 may include a rotor 15r coupled to the other side of the primary pulley 20 via a motor clutch 26. The wheels 19 may be coupled to the secondary pulley 21 via the output shaft 16, the propeller shaft 17, and the differential mechanism 18. The forward clutch 24 may be a portion of a forward-backward travel changeover mechanism.

The engine 12 may be provided with a crank shaft 30 coupled to a starter generator 31. The starter generator 31 may serve as an electric generator or an electric motor. The starter generator 31 may be a so-called integrated starter generator (ISG), and may have a function of controlling, for example, power generation voltage, power generation torque, and power running torque. The engine 12 may be provided with an engine auxiliary device 32. The engine auxiliary device 32 may be a throttle valve or an injector, for example. To control an operational state of the engine 12, the engine auxiliary device 32 and the starter generator 31 may be coupled to an engine control unit CU1, which is an electronic control unit. In addition, to control the forward clutch 24, the motor clutch 26, the continuously variable transmission mechanism 23, the torque converter 25 and other components of the power train 14, the power train 14 may be provided with a valve unit 33. The valve unit 33 may include, for example, a plurality of magnetic valves and oil passages. To control an operational state of the forward clutch 24 via the valve unit 33, the valve unit 33 may be coupled to a transmission control unit CU2, which is an electronic control unit.

The vehicle 11 may include a navigation system 40. The navigation system 40 may guide the vehicle 11 along a route to a destination set by a driver who drives the vehicle 11. The navigation system 40 may include a GPS receiver 41 and a communication unit 42. The GPS receiver 41 may receive signals from the satellites of the global positioning system (GPS). The communication unit 42 may receive traffic congestion information from an external server. The navigation system 40 may also include a navigation control unit CU3, which is an electronic control unit. The navigation control unit CU3 may have a function of calculating, for example, a travel route, a travel distance, and a necessary time to the destination on the basis of the traveling position of the vehicle 11 calculated from the signals received by the GPS receiver 41, and the traffic congestion information received by the communication unit 42. Although the navigation system 40 may be a system fixed on the vehicle 11 in the example illustrated in the drawings, the navigation system 40 should not be limited to this example. Alternatively, the navigation system 40 may be a portable information device, such as a smartphone.

[Electric Power Supply System]

Figure 3:
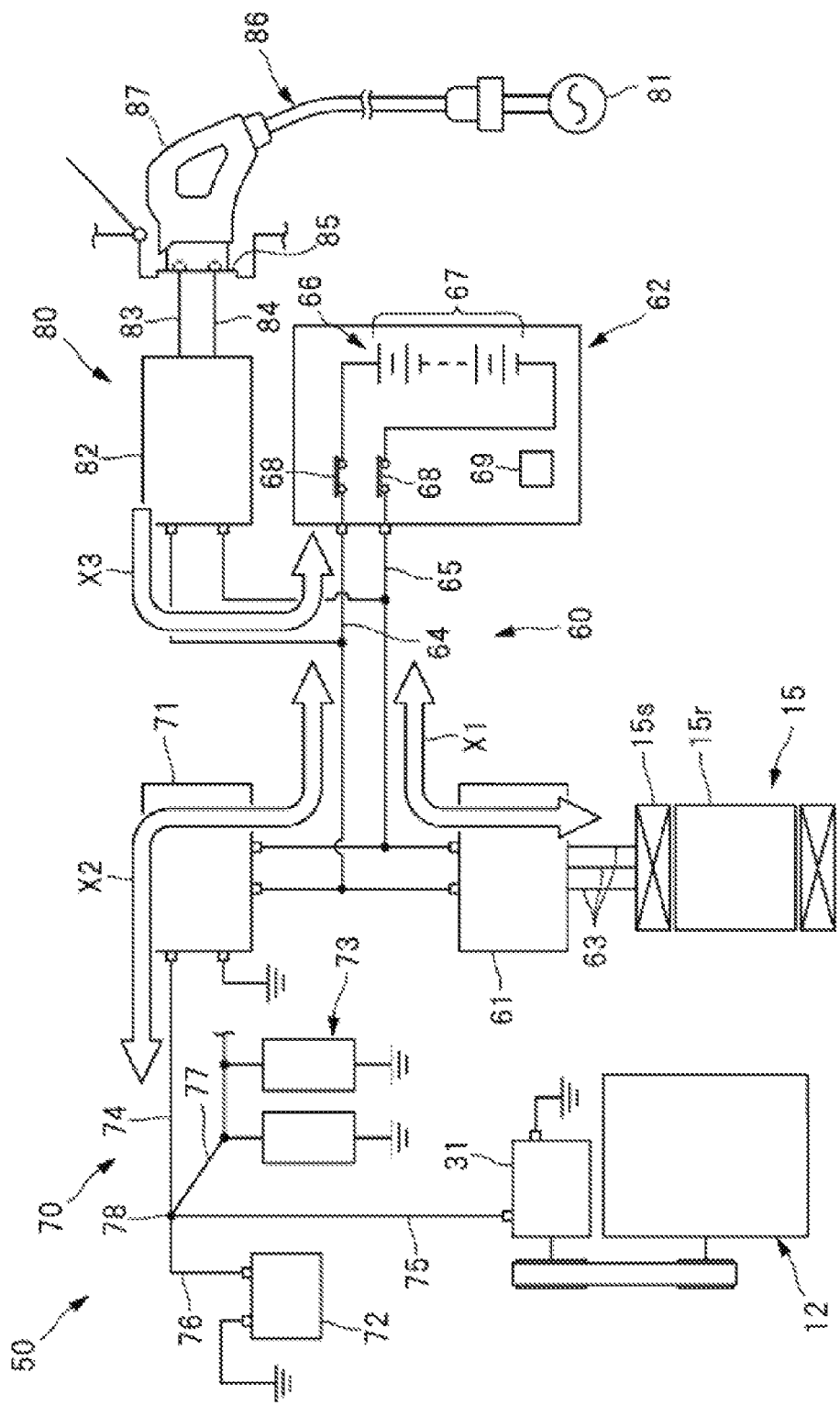
FIG. 3 is a diagram illustrating an exemplary electric power supply system according to one example embodiment of the technology.

In the following, an electric power supply system 50 is described which is to be mounted in the vehicle 11. FIG. 3 illustrates an example of the electric power supply system 50. As illustrated in FIG. 3, the electric power supply system 50 to be mounted in the vehicle 11 may include a high-voltage system 60, a low-voltage system 70, and an external charging system 80. The high-voltage system 60 may include the motor generator 15, an inverter 61, and a battery module 62. The inverter 61 may be an electric power converter coupled to a stator 15s of the motor generator 15 via a current-carrying line 63. The inverter 61 may also be coupled to the battery module 62 via power lines 64 and 65. The battery module 62 may include a high-voltage battery 66. The high-voltage battery 66 may include a plurality of battery cells 67. In one embodiment, the high-voltage battery 66 may serve as an "electric power storage device". The battery module 62 may further include a main relay 68 and a battery sensor 69. The main relay 68 may control coupling of the high-voltage battery 66 to the power lines 64 and 65. The battery sensor 69 may detect, for example, a charging current, a discharging current, a terminal voltage, and a temperature of the high-voltage battery 66.

As illustrated in FIG. 2, the battery module 62 may be coupled to a battery control unit CU4, which is an electronic control unit. The battery control unit CU4 may have functions of monitoring charging and discharging of the high-voltage battery 66 and controlling the main relay 68 and other components. The battery control unit CU4 may also have a function of calculating the state of charge (SOC) of the high-voltage battery 66 on the basis of the charging current, the discharging current, or the terminal voltage detected by the battery sensor 69. The SOC of the high-voltage battery 66 may be a rate indicating a remaining amount of electric power in the high-voltage battery 66. That is, the SOC of the high-voltage battery 66 may be a rate of a charged power amount to the full charge capacity of the high-voltage battery 66. For example, the SOC may be calculated as 100% in a case where the high-voltage battery 66 is charged to an upper limit capacity, and 0% in a case where the high-voltage battery 66 is discharged to a lower limit capacity.

The inverter 61 may control an energization state of the stator 15s. The inverter 61 may be coupled to a motor control unit CU5, which is an electronic control unit. The motor control unit CU5 may controls the inverter 61 including a plurality of switching elements to thereby control the power running torque and the power generation torque of the motor generator 15. To bring the motor generator 15 into a power running state, DC power supplied from the high-voltage battery 66 may be converted into AC power via the inverter 61, and the AC power may be supplied to the motor generator 15. In contrast, to bring the motor generator 15 into a regenerative state, AC power supplied from the motor generator 15 may be converted into DC power via the inverter 61, and the DC power may be supplied to the high-voltage battery 66.

Next, a description is given of the external charging system 80. The external charging system 80 may charge the high-voltage battery 66 using an external power source 81. As illustrated in FIG. 3, the external charging system 80 may include an in-vehicle charger 82 and an inlet 85. The in-vehicle charger 82 may be coupled to the battery module 62. The inlet 85 may be coupled to the in-vehicle charger 82 via current-carrying lines 83 and 84. In addition, the in-vehicle charger 82 may be coupled to a charging control unit CU6, which is an electronic control unit. The charging control unit CU6 may control the in-vehicle charger 82 including a plurality of switching elements to thereby control a charging voltage and a charging current to be supplied to the high-voltage battery 66. To charge the high-voltage battery 66 using the external power source 81, a connector 87 of a charging cable 86 extending from the external power source 81 may be detachably coupled to the inlet 85, as illustrated in FIG. 3. In a case where the high-voltage battery 66 is charged using the external power source 81 (hereinafter referred to as "plug charging"), AC power supplied from the external power source 81 may be converted into DC power via the in-vehicle charger 82, and the DC power may be supplied to the high-voltage battery 66.

Next, a description is given of the low-voltage system 70. The low-voltage system 70 may be coupled to the high-voltage system 60 via a converter 71. The low-voltage system 70 may include the converter 71, the starter generator 31, the low-voltage battery 72, and an electric device assembly 73. A positive electrode line 74 may be coupled to the converter 71, and a positive electrode line 75 may be coupled to the starter generator 31. In addition, a positive electrode line 76 may be coupled to the low-voltage battery 72, and a positive electrode line 77 may be coupled to the electric device assembly 73. These positive electrode lines 74 to 77 may be coupled to each other via a coupling node 78. A negative electrode line may be coupled to the converter 71, the starter generator 31, the low-voltage battery 72, and the electric device assembly 73. The negative electrode line may also be coupled to the body of the vehicle 11. The body of the vehicle 11 may serve as a reference potential point.

As described above, the high-voltage system 60 and the low-voltage system 70 may be coupled to each other via the converter 71, which is an electric power converter. The converter 71 may be coupled to the converter control unit CU7, which is an electronic control unit. The converter control unit CU7 may control the converter 71 including switching elements and coils to thereby supply electric power between the high-voltage system 60 and the low-voltage system 70. To supply electric power from the high-voltage system 60 to the low-voltage system 70, DC power supplied from the high-voltage system 60 may be decreased in voltage via the converter 71 and supplied to the low-voltage system 70. In contrast, to supply electric power from the low-voltage system 70 to the high-voltage system 60, DC power supplied from the low-voltage system 70 may be increased in voltage and supplied to the high-voltage system 60.

As described above, the converter 71 of the low-voltage system 70 and the in-vehicle charger 82 of the external charging system 80 may be coupled to the battery module 62 of the high-voltage system 60. This allows for charging and discharging between the battery module 62 and the motor generator 15, as indicated by an arrow X1 of FIG. 3, and charging and discharging between the battery module 62 and the low-voltage system 70, as indicated by an arrow X2 of FIG. 3. In a condition where the connector 87 of the charging cable 86 is coupled to the inlet 85, the battery module 62 may be charged with electric power supplied from the external charging system 80, as indicated by an arrow X3.

[Control System]

As illustrated in FIG. 2, the vehicle control apparatus 10 includes a control system 90 to control the power train 14, the electric power supply system 50, and other components. The control system 90 may include a plurality of electronic control units. Examples of the electronic control units in the control system 90 may include the engine control unit CU1, the transmission control unit CU2, the navigation control unit CU3, the battery control unit CU4, the motor control unit CU5, the charging control unit CU6, and the converter control unit CU7 that are described above. Other examples of the electronic control units in the control system 90 may include a vehicle control unit CU8. The vehicle control unit CU8 may output control signals to the control units CU1 to CU7. These control units CU1 to CU8 may be communicably coupled to each other via an in-vehicle network 91, such as a controller area network (CAN). The vehicle control unit CU8 may set operation targets of the power train 14 and the electric power supply system 50 on the basis of input information received from the control units CU1 to CU7 and various sensors described below. The vehicle control unit CU8 may generate control signals corresponding to the respective operation targets of the power train 14 and the electric power supply system 50, and output these control signals to the control units.

Examples of sensors coupled to the vehicle control unit CU8 may include a vehicle speed sensor 92, an accelerator sensor 93, and a brake sensor 94. The vehicle speed sensor 92 may detect a vehicle speed or a traveling speed of the vehicle 11. The accelerator sensor 93 may detect an operation amount of an accelerator pedal. The brake sensor 94 may detect an operation amount of a brake pedal. Other examples of sensors coupled to the vehicle control unit CU8 may include a fuel level sensor 95. The fuel level sensor 95 may detect the level of the liquid surface inside a non-illustrated fuel tank to thereby detect the remaining amount of fuel in the fuel tank. Further, a start switch 96 may be coupled to the vehicle control unit CU8. The start switch 96 may be operated by the driver to start the control system 90.

Figure 4:
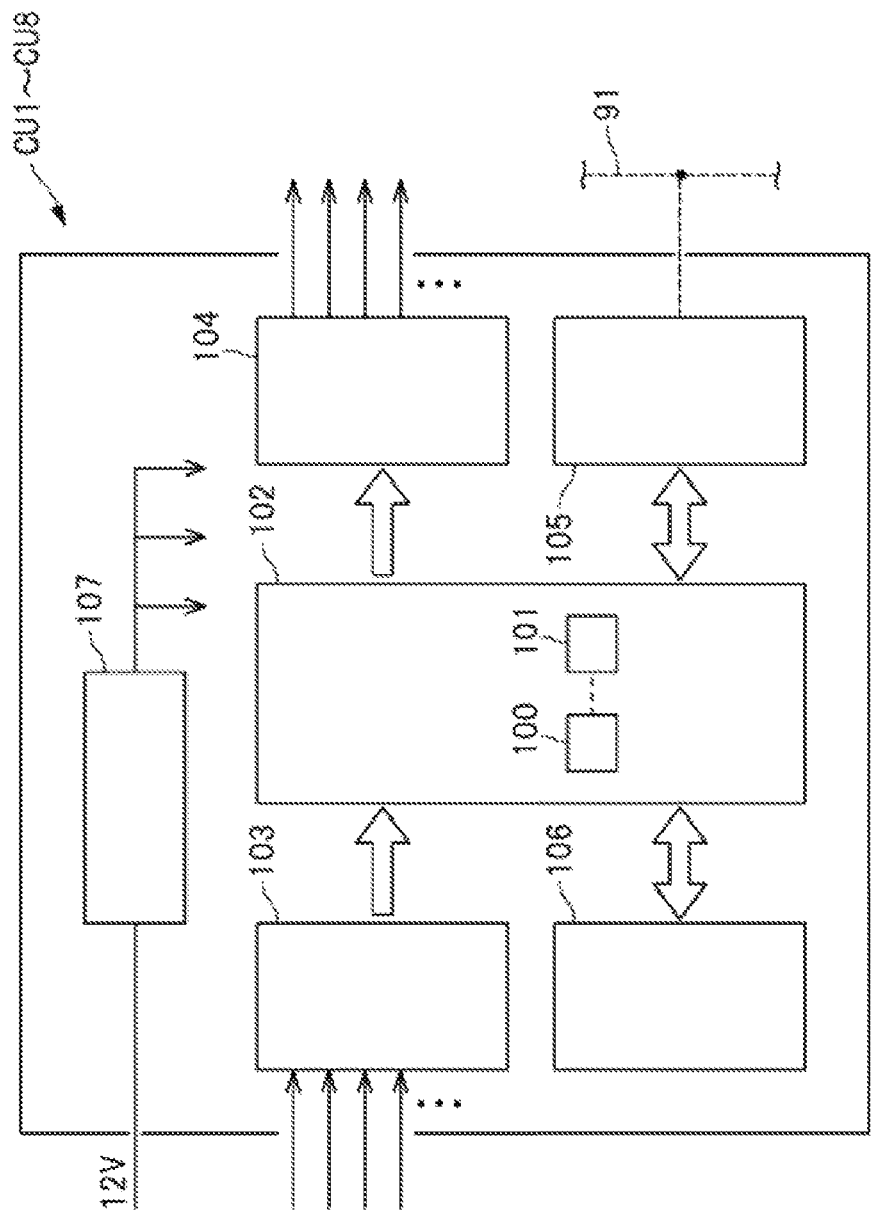
FIG. 4 is a diagram schematically illustrating basic configurations of control units according to one example embodiment of the technology.

FIG. 4 schematically illustrates basic configurations of the control units CU1 to CU8. As illustrated in FIG. 4, the control units CU1 to CU8 may each include a microcontroller 102. The microcontroller 102 may include, for example, a processor 100 and a memory 101. The memory 101 may store a predetermined program. The processor 100 may execute a command set of the program. The processor 100 and the memory 101 may be communicably coupled to each other. In the example illustrated in FIG. 4, the microcontroller 102 may include one processor 100 and one memory 101. However, the microcontroller 102 should not be limited to this example. Alternatively, the microcontroller 102 may include a plurality of processors 100 and a plurality of memories 101.

The control units CU1 to CU8 may each include an input conversion circuit 103, a drive circuit 104, a communication circuit 105, an external memory 106, a power circuit 107, and other elements. The input conversion circuit 103 may convert signals received from various sensors into signals receivable by the microcontroller 102. The drive circuit 104 may generate drive signals for driving actuators, such as the valve unit 33 described above, on the basis of signals outputted from the microcontroller 102. The communication circuit 105 may convert signals outputted from the microcontroller 102 into communication signals to be transmitted to the other control units. The communication circuit 105 may also convert communication signals received from the other control units into signals receivable by the microcontroller 102. The power circuit 107 may supply a stable power voltage to the microcontroller 102, the input conversion circuit 103, the drive circuit 104, the communication circuit 105, the external memory 106, and other elements. The external memory 106 may be, for example, a non-volatile memory that stores data to be held even while electric power is not supplied thereto.

[SOH Calculation Processing]

In the following, SOH calculation processing is described in which the state of health (SOH) of the high-voltage battery 66 is calculated. The SOH of the high-voltage battery 66 may refer to a capacity retention rate of a present state of the high-voltage battery 66 to an initial state of the high-voltage battery 66, i.e., a new high-voltage battery 66. That is, the SOH of the high-voltage battery 66 may be a rate of a present battery capacity to an initial battery capacity. Before the high-voltage battery 66 is deteriorated, a high SOH may be calculated because the capacity retention rate of the present state to the initial state is high. In contrast, after the high-voltage battery 66 is deteriorated, a low SOH may be calculated because the capacity retention rate of the present state to the initial state is low. The SOH of the high-voltage battery 66 may be used as an index indicating the deterioration state of the high-voltage battery 66. The SOH calculation processing in which the SOH is calculated may be performed in a condition where a charging or discharging current of the high-voltage battery 66 is stabilized, for example. For this reason, the SOH calculation processing may be performed together with the plug charging using the external power source 81.

Figure 5:
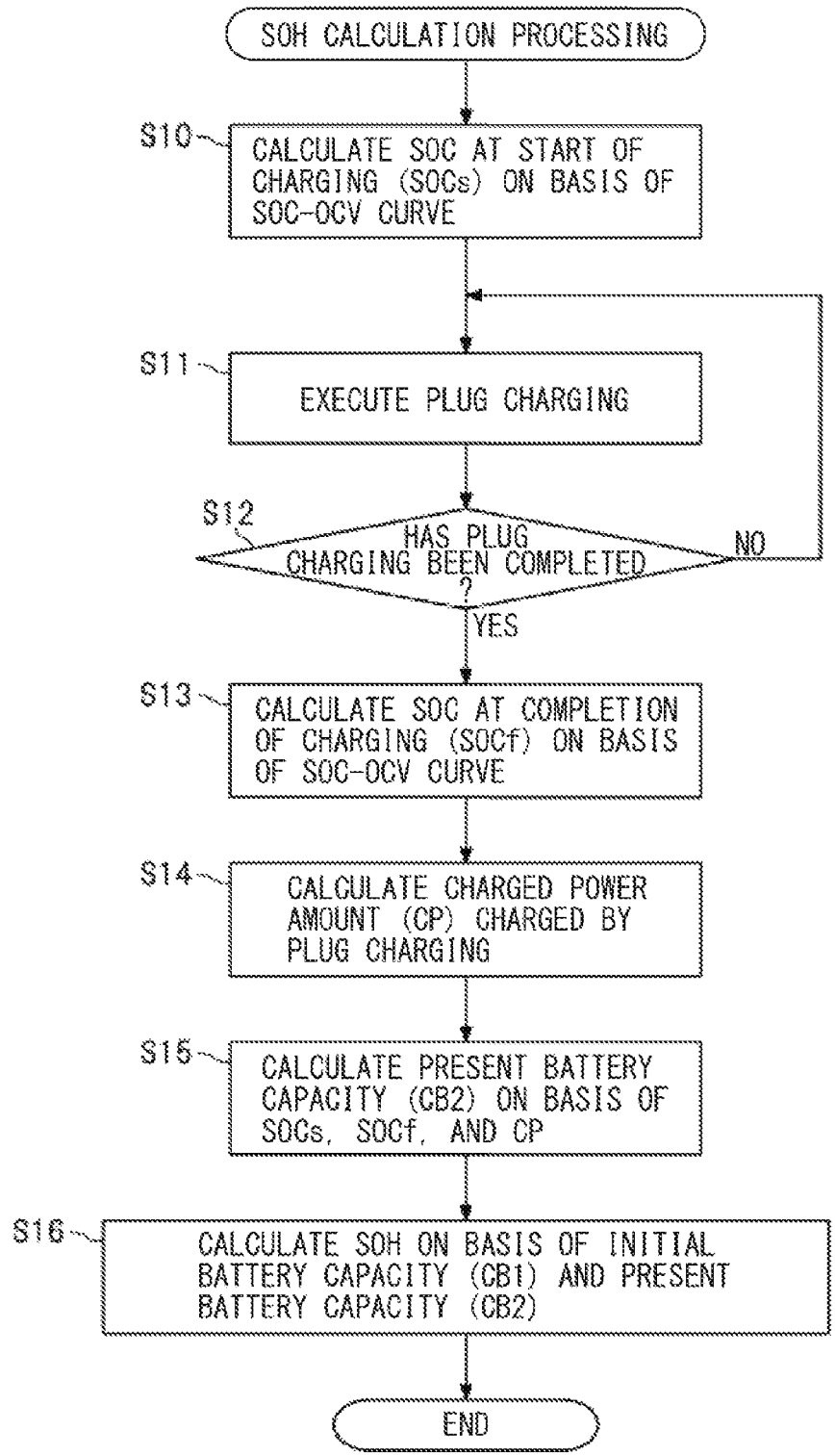
FIG. 5 is a flowchart illustrating an exemplary procedure for executing SOH calculation processing.
Figure 6:
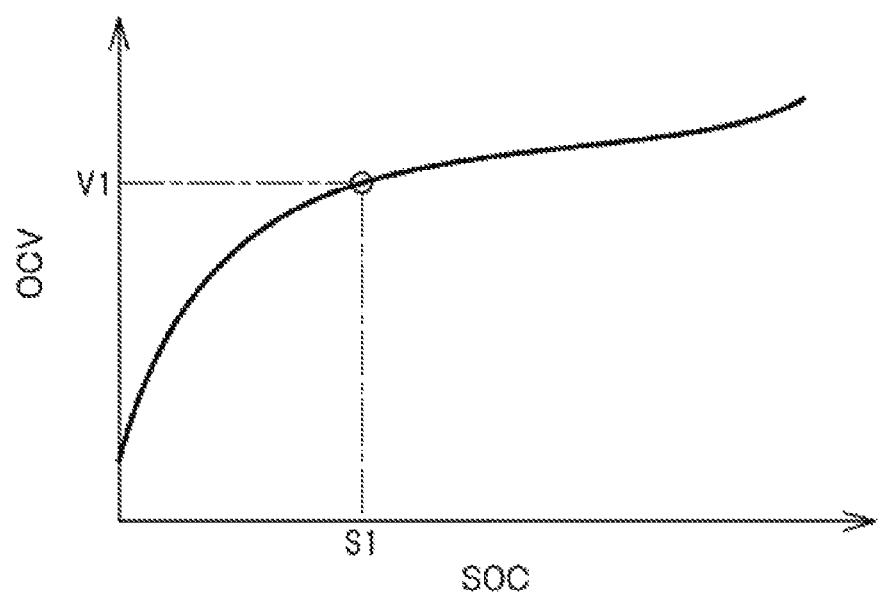
FIG. 6 is a diagram illustrating an exemplary SOC-OCV curve.
Figure 7:
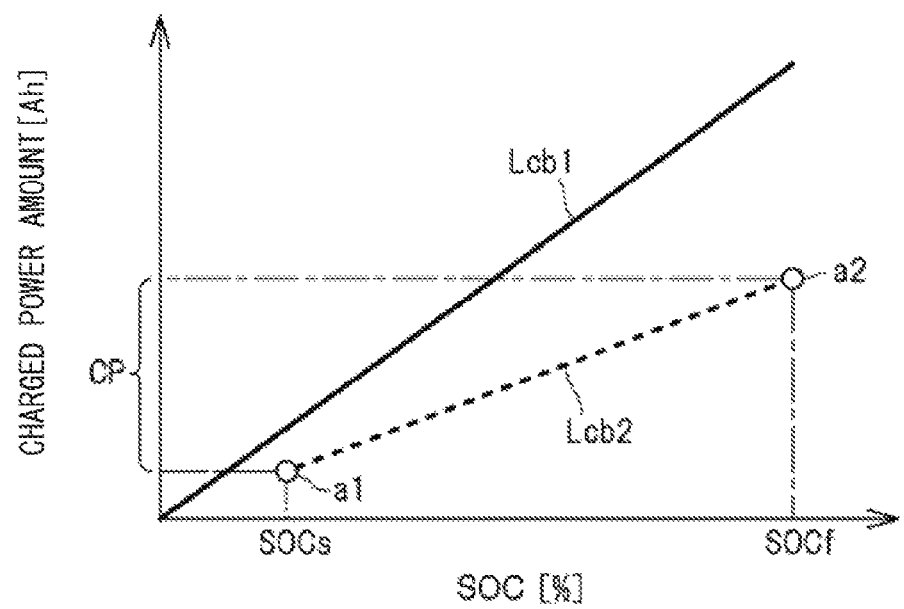
FIG. 7 is a diagram illustrating an exemplary calculation status of the SOH.

FIG. 5 is a flowchart illustrating an exemplary procedure for executing the SOH calculation processing. FIG. 6 illustrates an exemplary SOC-OCV curve, and FIG. 7 illustrates an exemplary calculation status of the SOH. Each step in the flowchart of FIG. 5 may indicate a process executed by one or more processors 100 in the control system 90. The SOH calculation processing illustrated in FIG. 5 may be executed by the control system 90 when an operator operates a button to start the plug charging.

As illustrated in FIG. 5, in Step S10, the control system 90 calculates the SOC at a start of charging (hereinafter referred to as SOCs) before the high-voltage battery 66 is charged by the in-vehicle charger 82. In one embodiment, the SOC at the start of charging may serve as a "first state of charge" of the high-voltage battery 66. That is, in Step S10, the control system 90 may calculate the SOCs on the basis of the terminal voltage of the high-voltage battery 66 by referring to the SOC-OCV curve using the terminal voltage of the high-voltage battery 66. For example, in a case where the terminal voltage of the high-voltage battery 66 is V1 as illustrated in FIG. 6, the SOCs may be calculated as S1. The SOC-OCV curve may be a curve illustrating a relationship between an open circuit voltage (OCV) of the high-voltage battery 66 and the SOC of the high-voltage battery 66.

After Step S10 in which the SOCs of the high-voltage battery 66 is calculated, the procedure may proceed to Step S11, as illustrated in FIG. 5. In Step S11, the control system 90 may cause the in-vehicle charger 82 to supply electric power to the high-voltage battery 66. Thereafter, in Step S12, the control system 90 may determine whether the plug charging has been completed. It may be determined that the plug charging has been completed in Step S12 in a case where, for example, the SOC of the high-voltage battery 66 reaches a predetermined target value or in a case where the execution time of the plug charging reaches a predetermined set time. If it is determined in Step S12 that the plug charging has been completed (Step S12: YES), the procedure may proceed to Step S13. In Step S13, the control system 90 calculates the SOC at the completion of charging (hereinafter referred to as SOCf). In one embodiment, the SOC at the completion of charging may serve as a "second state of charge" of the high-voltage battery 66. That is, in Step S13, the control system 90 may calculate the SOCf on the basis of the terminal voltage of the high-voltage battery 66 by referring to the SOC-OCV curve using the terminal voltage of the high-voltage battery 66. In contrast, if it is not determined in Step S12 that the plug charging has been completed (Step S12: NO), the procedure may return to Step S11. As described above, in Step S13, the SOCf of the high-voltage battery 66 may be calculated after the high-voltage battery 66 is charged by the in-vehicle charger 82.

Thereafter, in Step S14, the control system 90 may calculate the amount of charged electric power (hereinafter also referred to as a charged power amount) CP supplied from the in-vehicle charger 82 to the high-voltage battery 66. The charged power amount CP may refer to the amount of electric charge charged by the plug charging. The unit of the charged power amount CP may be ampere hour [Ah]. After the charged power amount CP is calculated in Step S14, the procedure may proceed to Step S15. In Step S15, the control system 90 may calculate a present battery capacity CB2 using the following expression:

$$CB2[Ah/SOC]=CP/(SOCf-SOCs) \quad \text{Expression 1.}$$

Thereafter, in Step S16, the control system 90 may calculate the SOH of the high-voltage battery 66 using the following expression:

$$SOH[\%]=CB2/CB1\times 100 \quad \text{Expression 2.}$$

In Expressions 1 and 2, the term "SOCs" may denote the SOC [%] at the start of the charging, i.e., the SOC before the plug charging. The term "SOCf" may denote the SOC at the completion of charging, i.e., the SOC after the plug charging. The term "CP" may denote the charged power amount [Ah] increased by the plug charging. The term "CB1" may denote the initial battery capacity per unit of SOC [Ah/SOC]. The term "CB2" may denote the present battery capacity per unit of SOC [Ah/SOC]. The initial battery capacity CB1 may refer to a battery capacity initially set at the time of design development of the battery, and the value of the initial battery capacity CB1 may be stored in the memory 101.

To calculate the SOH of the high-voltage battery 66, the SOC at the start of charging (SOCs) may be calculated on the basis of the terminal voltage of the high-voltage battery 66 before the plug charging, as indicated by a reference sign "a1" in FIG. 7. Thereafter, the SOC at the completion of charging (SOCf) may be calculated on the basis of the terminal voltage of the high-voltage battery 66 after the plug charging, as indicated by a reference sign "a2" in FIG. 7. Thereafter, the charged power amount CP of the high-voltage battery 66 charged by the plug charging may be divided by the increased amount of the SOC (SOCf−SOCs) to calculate the present battery capacity CB2 of the high-voltage battery 66. The magnitude of the present battery capacity CB2 may be represented by the slope of a broken line Lcb2, and the magnitude of the initial battery capacity CB1 may be represented by the slope of a solid line Lcb1. That is, a larger SOH may be calculated as the slope of the broken line Lcb2 approaches the slope of the solid line Lcb1 illustrated in FIG. 7.

[Polarization of High-Voltage Battery]

Figure 8A:
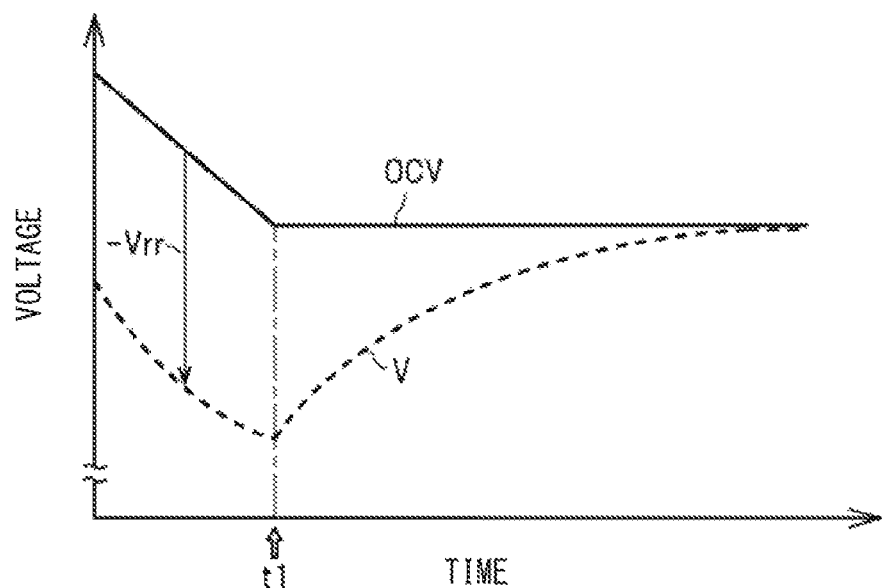
FIG. 8A is a diagram illustrating a state of polarization at the time of discharging of the high-voltage battery.
Figure 8B:
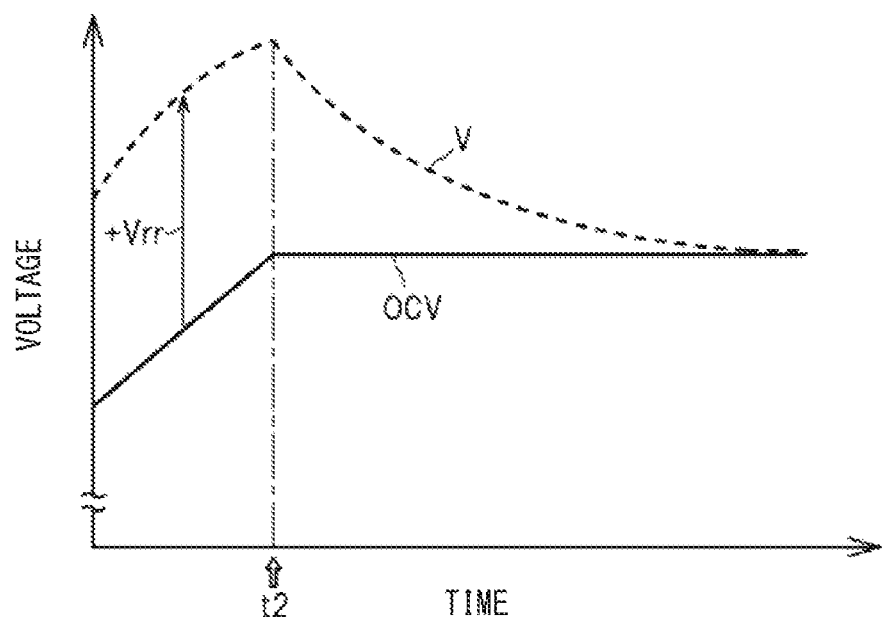
FIG. 8B is a diagram illustrating a state of polarization at the time of charging of the high-voltage battery.

In the following, polarization caused by charging and discharging of the high-voltage battery 66 is described. FIG. 8A illustrates a state of polarization at the time of discharging of the high-voltage battery 66, and FIG. 8B illustrates a state of polarization at the time of charging of the high-voltage battery 66. As illustrated in FIG. 8A, when the high-voltage battery 66 is discharged, a terminal voltage V may decrease prior to the open circuit voltage OCV. Thereafter, when the discharging of the high-voltage battery 66 is stopped at a time t1, the high-voltage battery 66 may be brought toward an electrochemical equilibrium state over time. This causes the terminal voltage V to approach the open circuit voltage OCV. In contrast, as illustrated in FIG. 8B, when the high-voltage battery 66 is charged, the terminal voltage V may increase prior to the open circuit voltage OCV. Thereafter, when the charging of the high-voltage battery 66 is stopped at a time t2, the high-voltage battery 66 may be brought toward the electrochemical equilibrium state over time. This causes the terminal voltage V to approach the open circuit voltage OCV. The polarization of the high-voltage battery 66 is supposed to be caused by polarization of the electrolyte concentration in the vicinity of the electrode.

As described above, at a time immediately after the discharging or charging of the high-voltage battery 66, the terminal voltage V of the high-voltage battery 66 can be largely deviated from the open circuit voltage OCV. Thus, it has been difficult to calculate the SOC on the basis of the terminal voltage V of the high-voltage battery 66 immediately after the charging or discharging of the high-voltage battery 66. However, as described above with reference to FIG. 5, the SOH calculation processing involves calculating the SOCs on the basis of the terminal voltage V of the high-voltage battery 66. In the SOH calculation processing, the timing when the SOCs of the high-voltage battery 66 is calculated, i.e., the timing when the plug charging is started is supposed to be a timing immediately after a stop of the vehicle 11 immediately after the stop of charging or discharging of the high-voltage battery 66. In this case, in order to enhance the accuracy in calculating the SOH of the high-voltage battery 66, it has been necessary to delay the calculation of the SOCs until the terminal voltage V approaches the open circuit voltage OCV.

However, such a delay in calculating the SOCs of the high-voltage battery 66 can cause a delay in starting the plug charging, which can prolong the time for plug charging. To address such a concern, the control system 90 executes a polarization eliminating mode in which the polarization of the high-voltage battery 66 is eliminated while the vehicle is traveling, as described below. Because the polarization of the high-voltage battery 66 is eliminated while the vehicle is traveling, it is possible to bring the terminal voltage V of the high-voltage battery 66 closer to the open circuit voltage OCV even immediately after the vehicle 11 stops. In other words, it is possible to calculate the SOCs with high accuracy even immediately after the vehicle 11 stops. This allows the plug charging to start at an early timing.

[Execution Determination Regarding Polarization Eliminating Mode A]

Figure 9A:
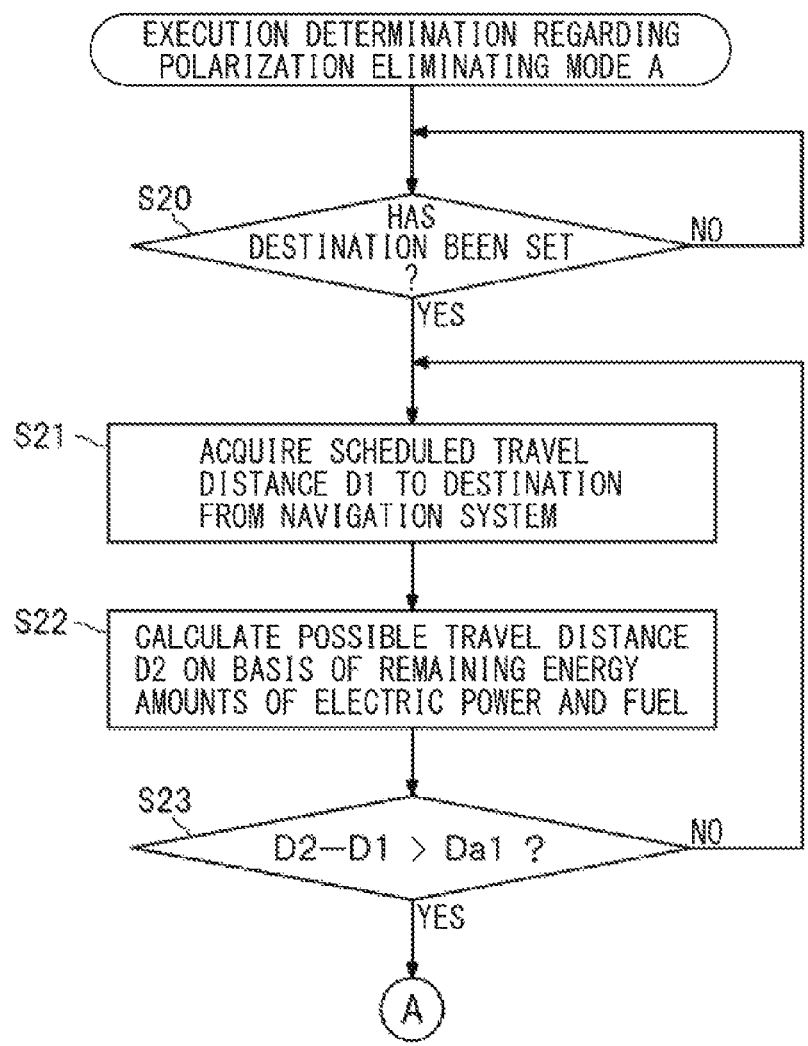
FIG. 9A is a flowchart illustrating an exemplary procedure for executing an execution determination regarding a polarization eliminating mode A.
Figure 9B:
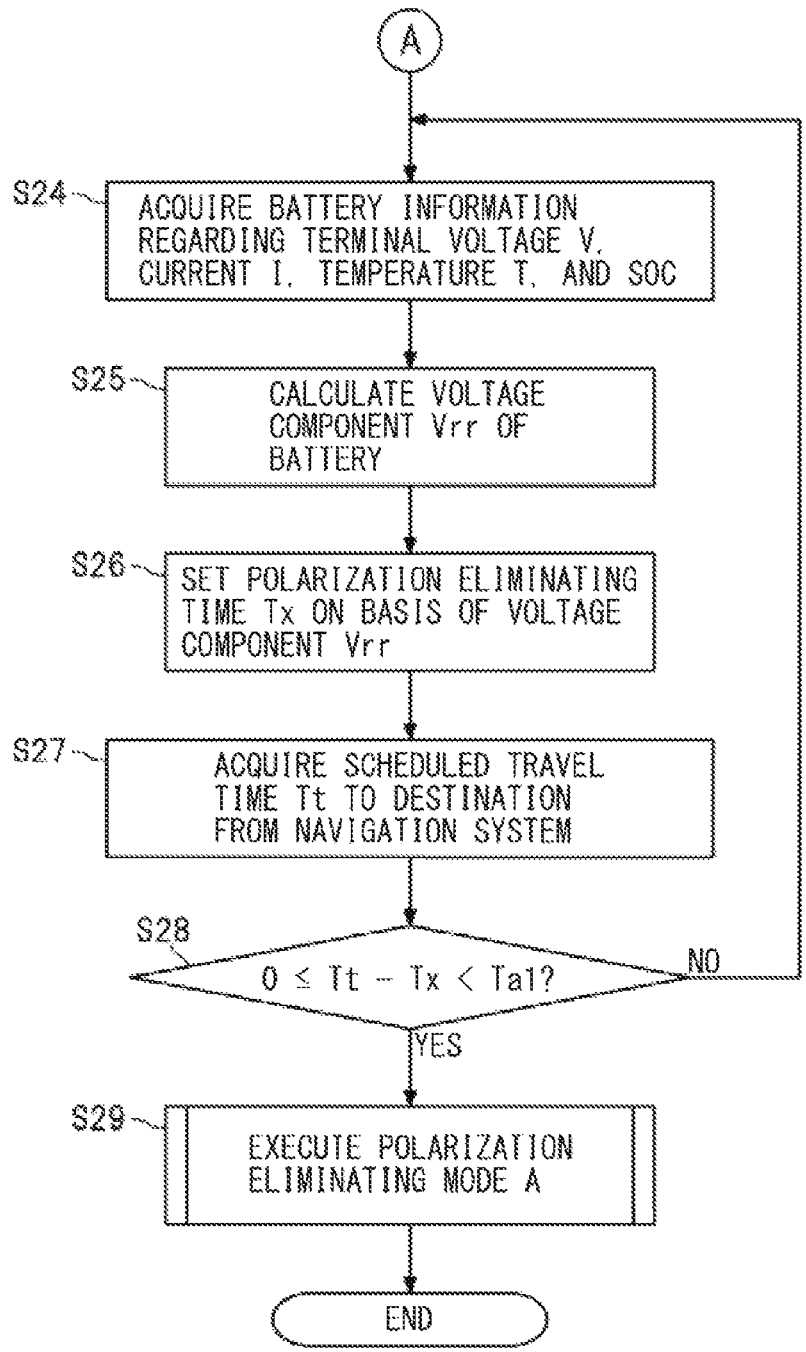
FIG. 9B is a flowchart illustrating an exemplary procedure for executing the execution determination regarding the polarization eliminating mode A.
Figure 10A:
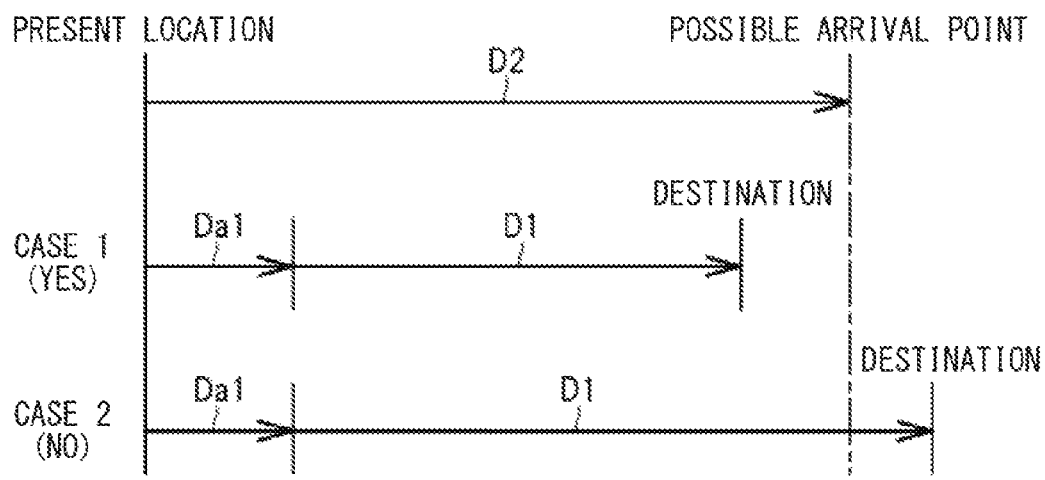
FIG. 10A is a diagram illustrating an exemplary execution status of the execution determination regarding the polarization eliminating mode A.
Figure 10B:
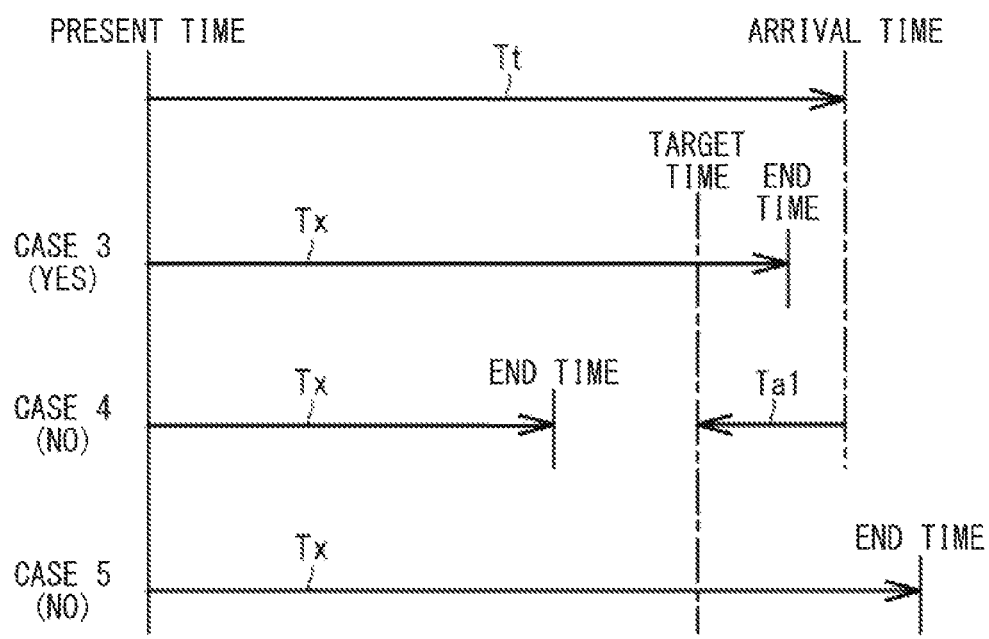
FIG. 10B is a diagram illustrating an exemplary execution status of the execution determination regarding the polarization eliminating mode A.

In the following, a determination as to whether a polarization eliminating mode A is to be executed is described first, following which the polarization eliminating mode A for eliminating the polarization is described. FIGS. 9A and 9B are flowcharts each illustrating an exemplary procedure for an execution determination regarding the polarization eliminating mode A. FIGS. 10A and 10B each illustrate an exemplary execution status of the execution determination regarding the polarization eliminating mode A. Note that the term "polarization eliminating mode A" may refer to a control mode in which the high-voltage battery 66 is charged or discharged to eliminate the polarization of the high-voltage battery 66.

The flowchart of FIG. 9A may be coupled to the flowchart of FIG. 9B at a portion A. Each step in the flowcharts of FIGS. 9A and 9B may indicate a process executed by one or more processors 100 in the control system 90. The execution determination illustrated in FIGS. 9A and 9B may be control executed by the control system 90 in a predetermined cycle after the driver operates the start switch 96 to start the control system 90, which includes the vehicle control unit CU8 and other components. That is, the execution determination illustrated in FIGS. 9A and 9B may be control executed by the control system 90 while the vehicle 11 is traveling.

As illustrated in FIG. 9A, the control system 90 may determine in Step S20 whether a destination has been set to the navigation system 40. If it is not determined in Step S20 that a destination has been set (Step S12: NO), the procedure may continue the process in Step S20. In contrast, if it is determined in Step S20 that a destination has been set (Step S20: YES), the procedure may proceed to Step S21. In Step S21, the control system 90 may acquire a scheduled travel distance D1 to the destination from the navigation system 40. Thereafter, the procedure may proceed to Step S22. In Step S22, the control system 90 may calculate a possible travel distance D2 of the vehicle 11 on the basis of the remaining energy amounts of electric power and fuel. The control system 90 may calculate the remaining energy amount of electric power on the basis of the SOC of the high-voltage battery 66, and the remaining energy amount of fuel on the basis of a detection signal from the fuel level sensor 95 in a predetermined cycle. The control system 90 may also calculate the amount of energy consumption per unit of distance in a predetermined cycle. In Step S22, the control system 90 may calculate the possible travel distance D2 of the vehicle 11 on the basis of the remaining energy amount of electric power, the remaining energy amount of fuel, and the amount of energy consumption per unit of distance.

Thereafter, the procedure may proceed to Step S23. In Step S23, the control system 90 may determine whether the value calculated by subtracting the scheduled travel distance D1 from the possible travel distance D2 is greater than a predetermined threshold Da1. Case 1 illustrated in FIG. 10A corresponds to a case where the value calculated by subtracting the scheduled travel distance D1 from the possible travel distance D2 is determined to be greater than the predetermined threshold Da1 in Step S23 (Step S23: YES). In Case 1, the energy may remain even after the vehicle 11 travels the scheduled travel distance D1 to the destination and the polarization eliminating mode A is executed. Accordingly, it may be determined that the polarization eliminating mode A is able to be executed on the basis of the remaining energy amount, and the procedure may proceed to Step S24 in FIG. 9B. In Step S24, the control system 90 may continue the execution determination regarding the polarization eliminating mode A.

In contrast, Case 2 illustrated in FIG. 10A corresponds to a case where the value calculated by subtracting the scheduled travel distance D1 from the possible travel distance D2 is determined to be less than or equal to the threshold Da1 in Step S23 (Step S23: NO). In Case 2, it may be estimated that the remaining energy amount is insufficient to cause the vehicle 11 to travel the scheduled travel distance D1 to the set destination and execute the polarization eliminating mode A. Accordingly, it may be determined that the polarization eliminating mode A is difficult to be executed on the basis of the remaining energy amount, and the procedure may return to Step S21.

As illustrated in Step S24 of FIG. 9B, the control system 90 may acquire the terminal voltage V, a charging/discharging current I, a cell temperature Tb, and the SOC of the high-voltage battery 66. Thereafter, the procedure may proceed to Step S25. In Step S25, the control system 90 may calculate a voltage component Vrr of an equivalent circuit model of the high-voltage battery 66. In Step S25, the control system 90 may calculate the voltage component Vrr on the basis of the charging/discharging current I using Expression 3 described below. Thereafter, in Step S26, the control system 90 sets a polarization eliminating time Tx on the basis of the voltage component Vrr indicating the polarization state. In one embodiment, the polarization eliminating time Tx may serve as a "first necessary time". For example, a longer polarization eliminating time Tx may be set as the absolute value of the voltage component Vrr increases.

$$V_{rr} = \frac{1}{C_r} \int_0^t \left(-I - \frac{V_{rr}}{R_r}\right) dt \qquad \text{Expression 3}$$

Figure 11:
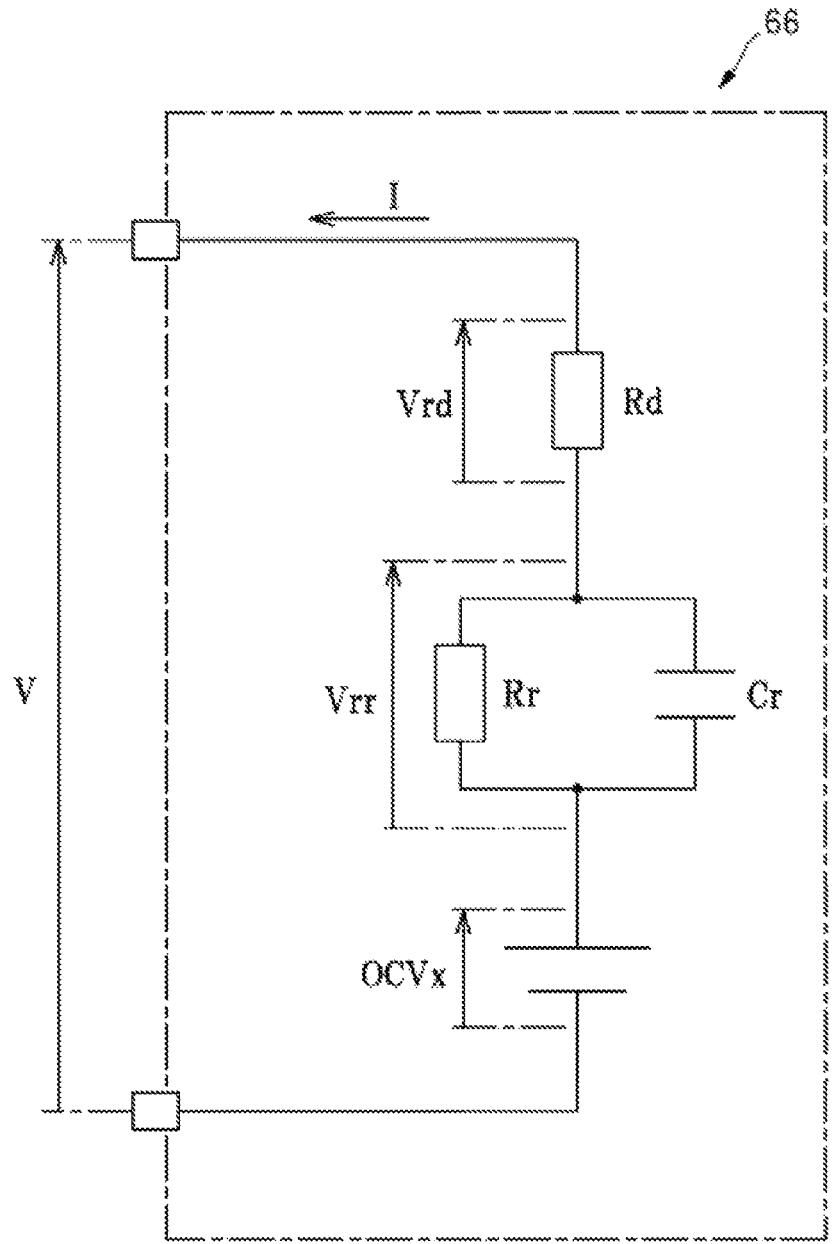
FIG. 11 is a diagram illustrating an exemplary equivalent circuit model of the high-voltage battery.

FIG. 11 illustrates the equivalent circuit model of the high-voltage battery 66. As illustrated in FIG. 11, the equivalent circuit model of the high-voltage battery 66 may include components that are changed by an electrochemical reaction in the battery: voltage component Vrd and Vrr, resistor components Rd and Rr, and a capacitor component Cr. The terminal voltage measured by the battery sensor 69 may be represented by "V", and an estimated open circuit voltage may be represented by "OCVx".

When the polarization is generated in the high-voltage battery 66, the voltage component Vrr may change in a charging direction or a discharging direction. That is, as illustrated in FIG. 8A, the voltage component Vrr may be generated on a negative side when the high-voltage battery 66 is discharged. As the discharge current of the high-voltage battery 66 increases, a larger voltage component Vrr may be generated on the negative side. In contrast, as illustrated in FIG. 8B, the voltage component Vrr may be generated on a positive side when the high-voltage battery 66 is charged. As the charge current of the high-voltage battery 66 increases, a larger voltage component Vrr may be generated on the positive side.

In the equilibrium state in which the polarization of the high-voltage battery 66 is eliminated, the voltage component Vrr may change to near zero. Accordingly, the control system 90 may calculate the voltage component Vrr using Expression 3 described above, and set the polarization eliminating time Tx necessary to eliminate the voltage component Vrr. As the voltage component Vrr becomes larger, it may take a longer time to establish the equilibrium state. Thus, a longer polarization eliminating time Tx may be set as the absolute value of the voltage component Vrr increases. That is, a longer polarization eliminating time Tx may be set as the voltage component Vrr becomes larger on the negative side, or as the voltage component Vrr becomes larger on the positive side.

After Step S26 of FIG. 9B in which the polarization eliminating time Tx is set, the procedure may proceed to Step S27. In Step S27, the control system 90 acquires a scheduled travel time Tt to the destination from the navigation system 40. In one embodiment, the scheduled travel time Tt may serve as a "second necessary time". Thereafter, the procedure may proceed to Step S28. In Step S28, the control system 90 may determine whether the value calculated by subtracting the polarization eliminating time Tx from the scheduled travel time Tt is greater than or equal to zero (0) and less than a predetermined threshold (herein also referred to as a predetermined time) Ta1. Case 3 illustrated in FIG. 10B corresponds to a case where the value calculated by subtracting the polarization eliminating time Tx from the scheduled travel time Tt is determined to be greater than or equal to zero (0) and less than the predetermined threshold Ta1 in Step S28 (Step S28: YES). In Case 3, the end of the polarization eliminating time Tx is included within the predetermined time Ta1 prior to a time of arrival at the destination.

In this case, it may be estimated that the vehicle 11 will arrive at the destination without taking a long time after the end of the polarization eliminating mode A. That is, it may be estimated that the plug charging will start after the arrival at the destination without greatly charging or discharging the high-voltage battery 66 after the end of the polarization eliminating mode A. The procedure may thus proceed to Step S29. In Step S29, the control system 90 executes the polarization eliminating mode A while the vehicle 11 is traveling. Accordingly, it is possible to execute the polarization eliminating mode A at an appropriate timing even while the vehicle 11 is traveling.

In contrast, Case 4 illustrated in FIG. 10B corresponds to a case where the value calculated by subtracting the polarization eliminating time Tx from the scheduled travel time Tt is determined to be greater than or equal to the threshold Ta1 in Step S28 (Step S28: NO). In Case 4, the end of the polarization eliminating time Tx is not included within the predetermined time Ta1 prior to the time of arrival at the destination. In this case, the vehicle 11 can continue traveling even after the polarization eliminating mode A ends, which can generate polarization in the high-voltage battery 66 again. Accordingly, the control system 90 refrains from permitting the polarization eliminating mode A to be executed, and the procedure may return to Step S24. Thereafter, the determination may be made as to whether the execution of the polarization eliminating mode A is to be permitted.

Case 5 illustrated in FIG. 10B corresponds to a case where the value calculated by subtracting the polarization eliminating time Tx from the scheduled travel time Tt is determined to be less than zero (0) in Step S28 (Step S28: NO). In Case 5, the end of the polarization eliminating time Tx is not included within the predetermined time Ta1 prior to the time of arrival at the destination. In this case, it is difficult to end the polarization eliminating mode A before the vehicle 11 arrives at the destination. Accordingly, the control system 90 refrains from permitting the polarization eliminating mode A to be executed, and the procedure may return to Step S24. Thereafter, the determination may be made as to whether the execution of the polarization eliminating mode A is to be permitted.

In the above description, the polarization eliminating mode A is permitted to be executed while the vehicle 11 is traveling in a case where the value calculated by subtracting the polarization eliminating time Tx from the scheduled travel time Tt is greater than or equal to zero (0) and less than the threshold Ta1, as illustrated in Step S28. However, this is a non-limiting example. For example, the polarization eliminating mode A may be permitted to be executed while the vehicle 11 is traveling in a case where the value calculated by subtracting the polarization eliminating time Tx from the scheduled travel time Tt is greater than or equal to zero (0). In other words, the polarization eliminating mode A may be permitted to be executed while the vehicle 11 is traveling in a case where the polarization eliminating time Tx is less than or equal to the scheduled travel time Tt. As described above, the control system 90 permits the polarization eliminating mode A to be executed while the vehicle 11 is traveling in a case where the polarization eliminating time Tx is less than or equal to the scheduled travel time Tt, whereas refrains from permitting the polarization eliminating mode A to be executed while the vehicle 11 is traveling in a case where the polarization eliminating time Tx is greater than the scheduled travel time Tt. Therefore, it is possible to execute the polarization eliminating mode A at an appropriate timing even while the vehicle 11 is traveling.

[Polarization Eliminating Mode A]

Figure 12:
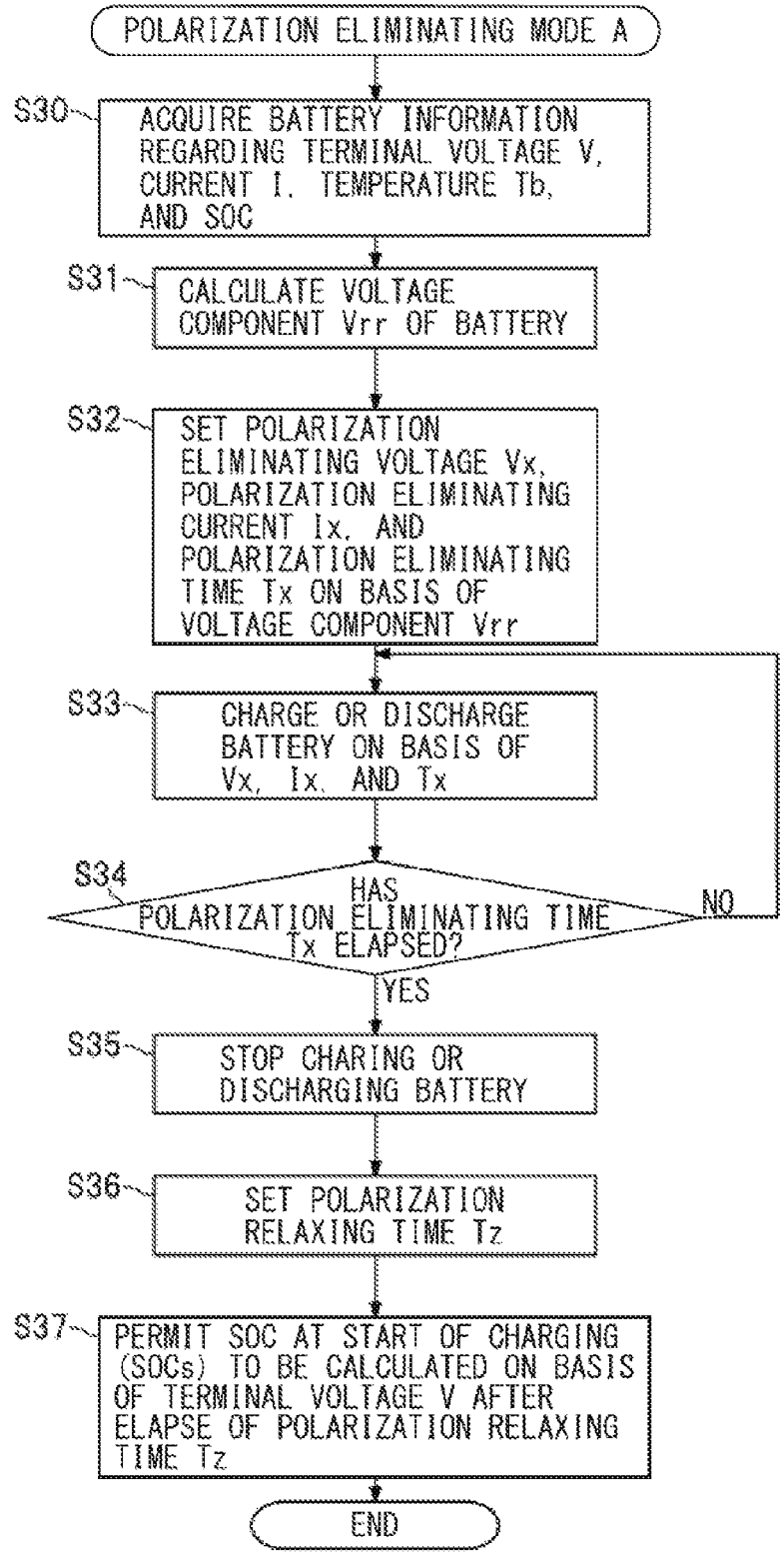
FIG. 12 is a flowchart illustrating an exemplary procedure for executing the polarization eliminating mode A.

In the following, an exemplary procedure for executing the polarization eliminating mode A in which the polarization of the high-voltage battery 66 is eliminated is described. FIG. 12 is a flowchart illustrating the exemplary procedure for executing the polarization eliminating mode A. Each step in the flowchart of FIG. 12 may indicate a process executed by one or more processors 100 in the control system 90. Note that the polarization eliminating mode A illustrated in FIG. 12 may correspond to the polarization eliminating mode executed in Step S29 of FIG. 9 described above, i.e., the polarization eliminating mode executed while the vehicle 11 is traveling.

As illustrated in Step S30 of FIG. 12, the control system 90 may acquire the terminal voltage V, the charging/discharging current I, the cell temperature Tb, and the SOC of the high-voltage battery 66. Thereafter, the procedure may proceed to Step S31. In Step S31, the control system 90 may calculate the voltage component Vrr on the basis of the charging/discharging current I using Expression 3 described above. Thereafter, the procedure may proceed to Step S32. In Step S32, the control system 90 may set a polarization eliminating voltage Vx, a polarization eliminating current Ix, and the polarization eliminating time Tx on the basis of the voltage component Vrr.

As described above, the voltage component Vrr may change in the charging direction or the discharging direction when the polarization is generated in the high-voltage battery 66. That is, as illustrated in FIG. 8A, the voltage component Vrr may be generated on the negative side when the high-voltage battery 66 is discharged. As the discharge current of the high-voltage battery 66 increases, a larger voltage component Vrr may be generated on the negative side. In contrast, as illustrated in FIG. 8B, the voltage component Vrr may be generated on the positive side when the high-voltage battery 66 is charged. As the charge current of the high-voltage battery 66 increases, a larger voltage component Vrr may be generated on the positive side.

Accordingly, in a case where the voltage component Vrr is generated on the negative side, the polarization eliminating voltage Vx and the polarization eliminating current Ix may be set on a charging side of the high-voltage battery 66. A higher polarization eliminating voltage Vx may be set as the voltage component Vrr becomes larger on the negative side. A larger polarization eliminating current Ix may be set on the charging side as the voltage component Vrr becomes larger on the negative side. In addition, a longer polarization eliminating time Tx may be set as the voltage component Vrr becomes larger on the negative side. In contrast, in a case where the voltage component Vrr is generated on the positive side, the polarization eliminating voltage Vx and the polarization eliminating current Iz may be set on a discharging side of the high-voltage battery 66. A lower polarization eliminating voltage Vx may be set as the voltage component Vrr becomes larger on the positive side. A larger polarization eliminating current Ix may be set on the discharging side as the voltage component Vrr becomes larger on the positive side. In addition, a longer polarization eliminating time Tx may be set as the voltage component Vrr becomes larger on the positive side.

As illustrated in FIG. 12, after Step S32 in which the polarization eliminating voltage Vx and the polarization eliminating current Ix are set, the procedure may proceed to Step S33. In Step S33, the control system 90 may execute a polarization eliminating process in which the high-voltage battery 66 is charged or discharged on the basis of the polarization eliminating voltage Vx and the polarization eliminating current Ix. Thereafter, the procedure may proceed to Step S34. In Step S34, the control system 90 may determine whether the polarization eliminating time Tx has elapsed. If it is not determined in Step S34 that the polarization eliminating time Tx has elapsed (Step S34: NO), the procedure may return to Step S33. If it is determined in Step S34 that the polarization eliminating time Tx has elapsed (Step S34: YES), i.e., if it is determined that the high-voltage battery 66 has been charged or discharged for the polarization eliminating time Tx, the procedure may proceed to Step S35. In Step S35, the control system 90 may stop charging or discharging the high-voltage battery 66. Thereafter, the procedure may proceed to Step S36. In Step S36, the control system 90 may set a predetermined polarization relaxation time Tz, following which the procedure may proceed to Step S37. In Step S37, the control system 90 may permit the SOCs to be calculated on the basis of the terminal voltage V of the high-voltage battery 66 after the elapse of the polarization relaxation time Tz. Note that the polarization relaxation time Tz may be a predetermined fixed value or a value variable depending on the voltage component Vrr and other components.

Figure 13A:
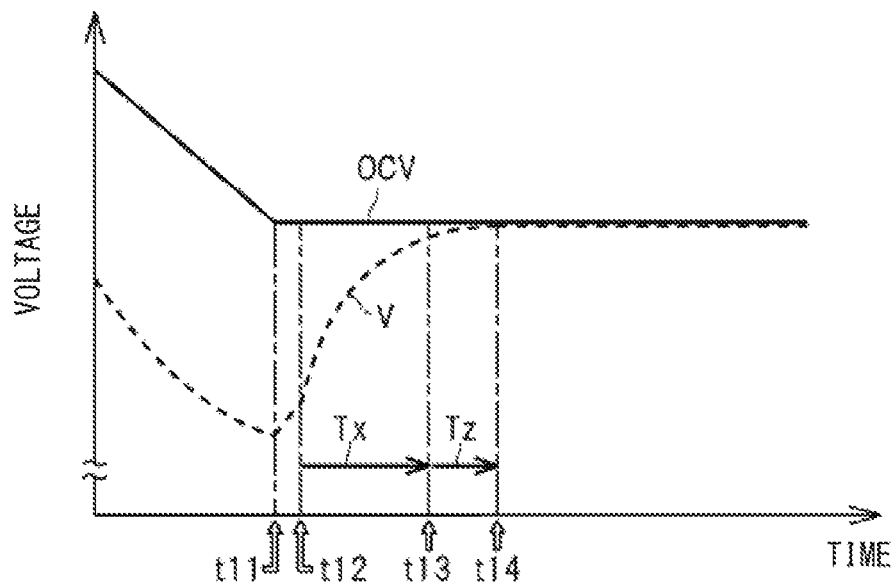
FIG. 13A is a diagram illustrating an exemplary execution status of the polarization eliminating mode A.
Figure 13B:
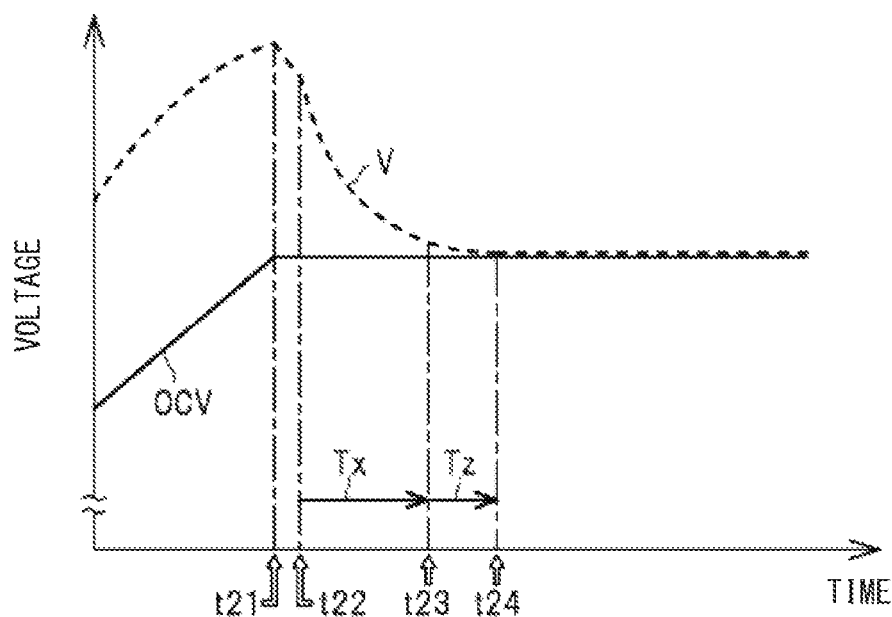
FIG. 13B is a diagram illustrating an exemplary execution status of the polarization eliminating mode A.

FIGS. 13A and 13B each illustrate an exemplary execution status of the polarization eliminating mode A. In a case where the high-voltage battery 66 is discharged before the execution of the polarization eliminating mode A as illustrated in FIG. 13A, the discharging of the high-voltage battery 66 may be stopped at a time t11 while the vehicle 11 is traveling. Thereafter, charging of the high-voltage battery 66 may start on the basis of the polarization eliminating voltage Vx and the polarization eliminating current Ix at a time t12, and the charging of the high-voltage battery 66 may continue until the polarization eliminating time Tx reaches a time t13. Thereafter, when the polarization relaxation time Tz reaches a time t14, the terminal voltage V may approach the open circuit voltage OCV. Accordingly, the calculation of the SOCs in association with the SOH calculation processing at the time of the plug charging described above may be permitted.

To charge the high-voltage battery 66 in the polarization eliminating mode A, electric power may be supplied from the motor generator 15 to the high-voltage battery 66 via the inverter 61, as illustrated by an arrow X1 in FIG. 3, or may be supplied from the starter generator 31 to the high-voltage battery 66 via the converter 71, as illustrated by an arrow X2 in FIG. 3. In a case where electric power is supplied from the starter generator 31 to the high-voltage battery 66 via the converter 71, the motor clutch 26 may be released to stop the rotation of the motor generator 15 while the vehicle 11 is traveling.

In contrast, in a case where the high-voltage battery 66 is charged before the execution of the polarization eliminating mode A, as illustrated in FIG. 13B, the charging of the high-voltage battery 66 may be stopped at a time t21 while the vehicle 11 is traveling. Thereafter, discharging of the high-voltage battery 66 may start on the basis of the polarization eliminating voltage Vx and the polarization eliminating current Ix at a time t22, and the discharging of the high-voltage battery 66 may continue until the polarization eliminating time Tx reaches a time t23. Thereafter, when the polarization relaxation time Tz reaches a time t24, the terminal voltage V may approach the open circuit voltage OCV. Accordingly, the calculation of SOCs in association with the SOH calculation processing at the time of the plug charging described above may be permitted.

To discharge the high-voltage battery 66 in the polarization eliminating mode A, electric power may be supplied from the high-voltage battery 66 to the motor generator 15 via the inverter 61, as illustrated by the arrow X1 in FIG. 3, or may be supplied from the high-voltage battery 66 to the starter generator 31 via the converter 71, as illustrated by the arrow X2 in FIG. 3. In a case where electric power is supplied from the high-voltage battery 66 to the starter generator 31 via the converter 71, the motor clutch 26 may be released to stop the rotation of the motor generator 15 while the vehicle 11 is traveling.

Next, a description is given of another exemplary method of setting the polarization eliminating voltage Vx in the polarization eliminating mode A. The condition in which the polarization of the high-voltage battery 66 is eliminated may correspond to the condition in which the terminal voltage V approaches the open circuit voltage OCV. Thus, the open circuit voltage OCV may be estimated from the equivalent circuit model illustrated in FIG. 11, and the polarization eliminating voltage Vx may be set on the basis of the estimated open circuit voltage OCV (hereinafter referred to as an open circuit voltage OCVx).

For the equivalent circuit model of the high-voltage battery 66 illustrated in FIG. 11, the charging/discharging current I of the high-voltage battery 66 may be measured to calculate the voltage component Vrr using Expression 3 described above, and the voltage component Vrd using Expression 4 described below. Thereafter, the terminal voltage V of the high-voltage battery 66 may be measured to calculate the open circuit voltage OCVx using Expression 5 described below. It is possible to appropriately eliminate the polarization of the high-voltage battery 66 by executing the polarization eliminating mode A using the open circuit voltage OCVx as the polarization eliminating voltage Vx.

$$V_{rd} = -R_d I \qquad \text{Expression 4}$$

$$OCV_x = V - V_{rd} - V_{rr} \qquad \text{Expression 5}$$

Figure 14:
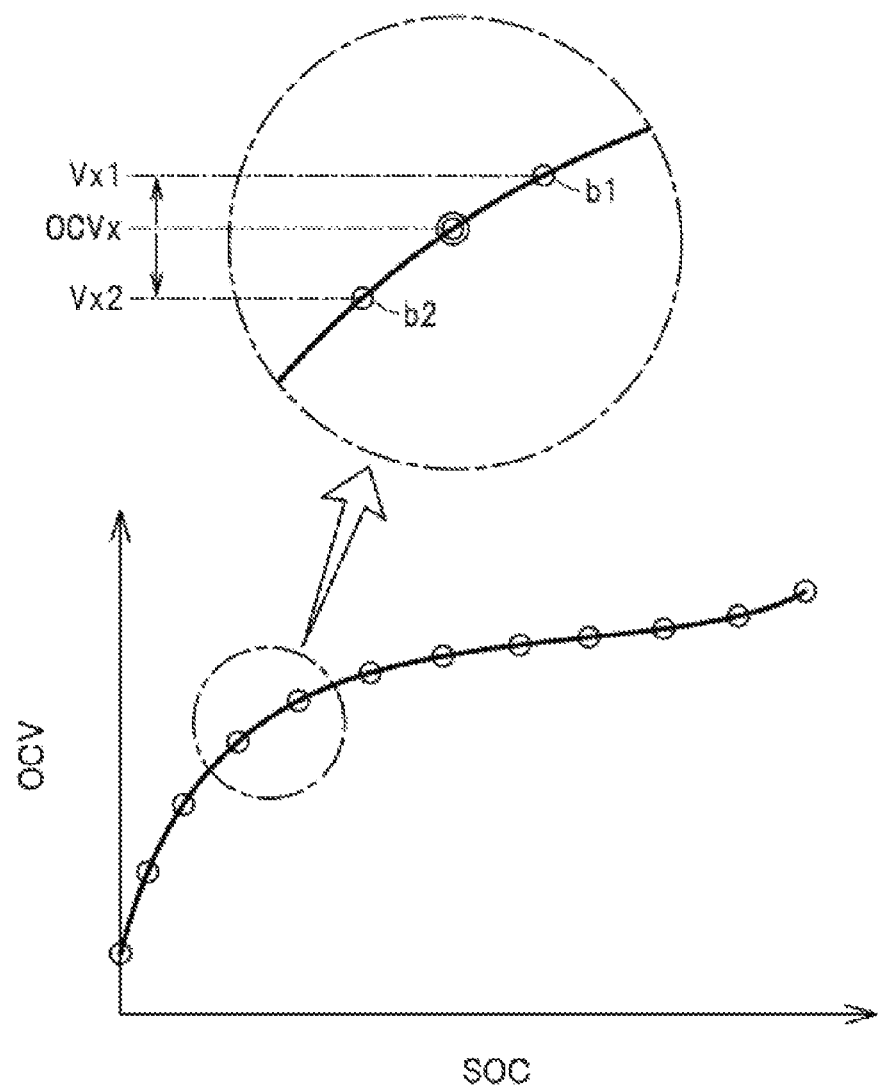
FIG. 14 is a diagram illustrating an exemplary SOC-OCV curve.

FIG. 14 illustrates an exemplary SOC-OCV curve. In FIG. 14, actual measurement points measured in a development stage of the high-voltage battery 66 are indicated with hollow circles. As indicated with the hollow circles in FIG. 14, a plurality of measurement points may be set on the SOC-OCV curve. At these measurement points, the relationship between the open circuit voltage OCV and the SOC were actually measured in the development stage. Therefore, it is possible to calculate the SOC with high accuracy.

As illustrated in an enlarged portion in FIG. 14, in a case where the open circuit voltage OCVx estimated using Expression 5 described above is a voltage value between a measurement point b1 and a measurement point b2, a voltage Vx1 at the measurement point b1 or a voltage of Vx2 at the measurement point b2 may be set in place of the open circuit voltage OCVx as the polarization eliminating voltage Vx. This allows the terminal voltage V measured in the SOH calculation processing to approach the voltage Vx1 at the measurement point b1 or the voltage Vx2 at the measurement point b2 after the execution of the polarization eliminating mode A. Accordingly, it is possible to calculate the SOCs with high accuracy.

[Execution Determination Regarding Polarization Eliminating Mode B]

Figure 15A:
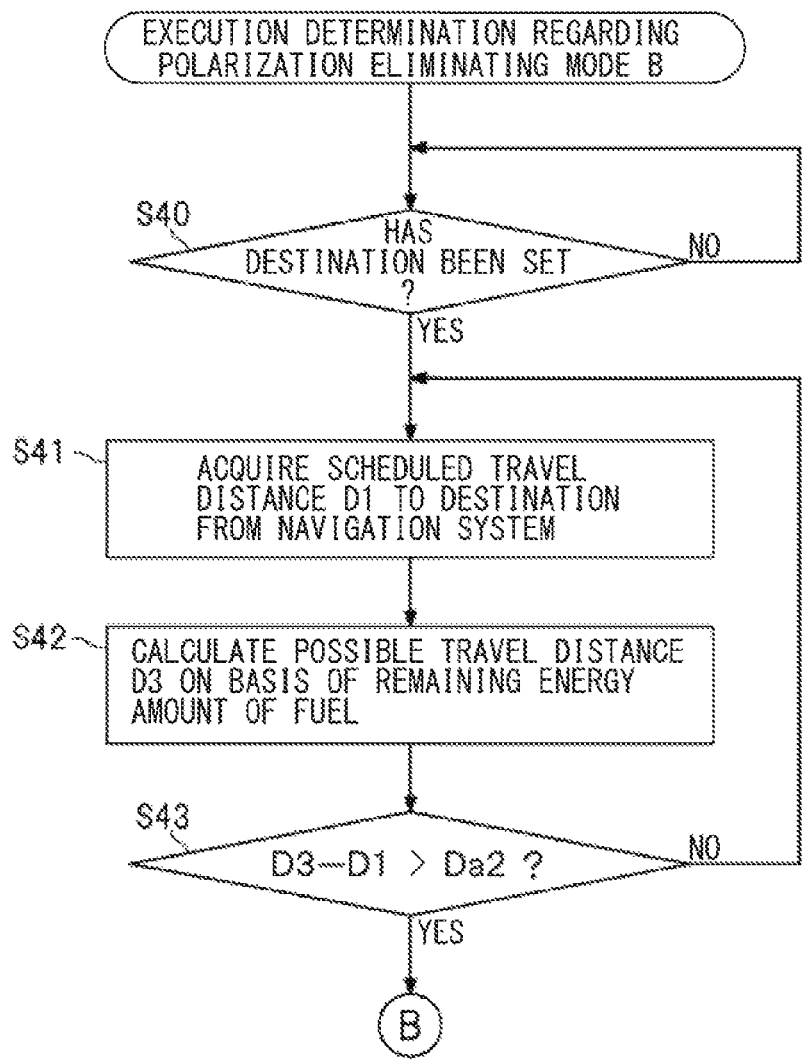
FIG. 15A is a flowchart illustrating an exemplary procedure for executing an execution determination regarding a polarization eliminating mode B.
Figure 15B:
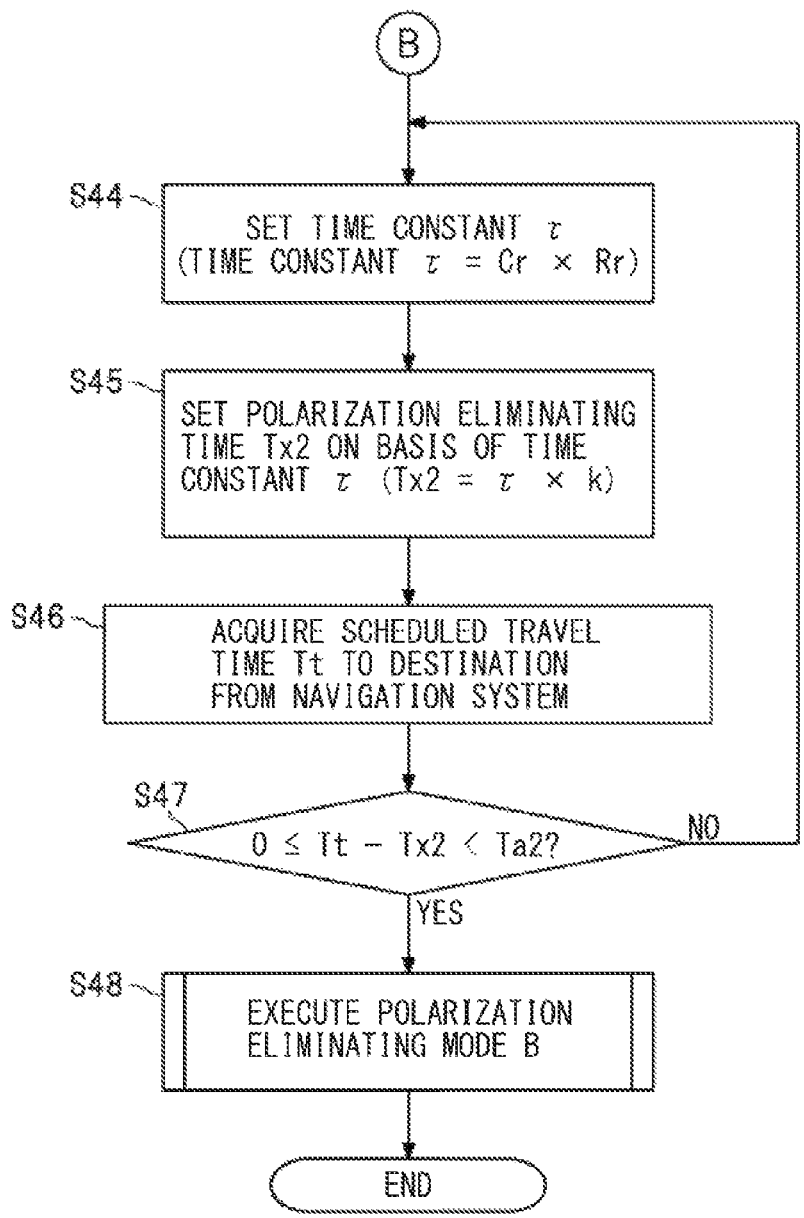
FIG. 15B is a flowchart illustrating an exemplary procedure for executing the execution determination regarding the polarization eliminating mode B.
Figure 16A:
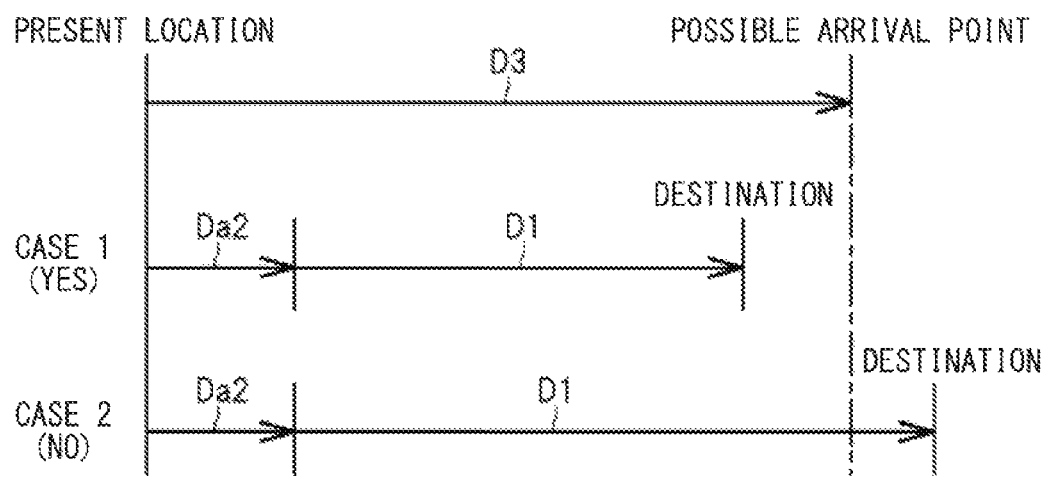
FIG. 16A is a diagram illustrating an exemplary execution status of the execution determination regarding the polarization eliminating mode B.
Figure 16B:
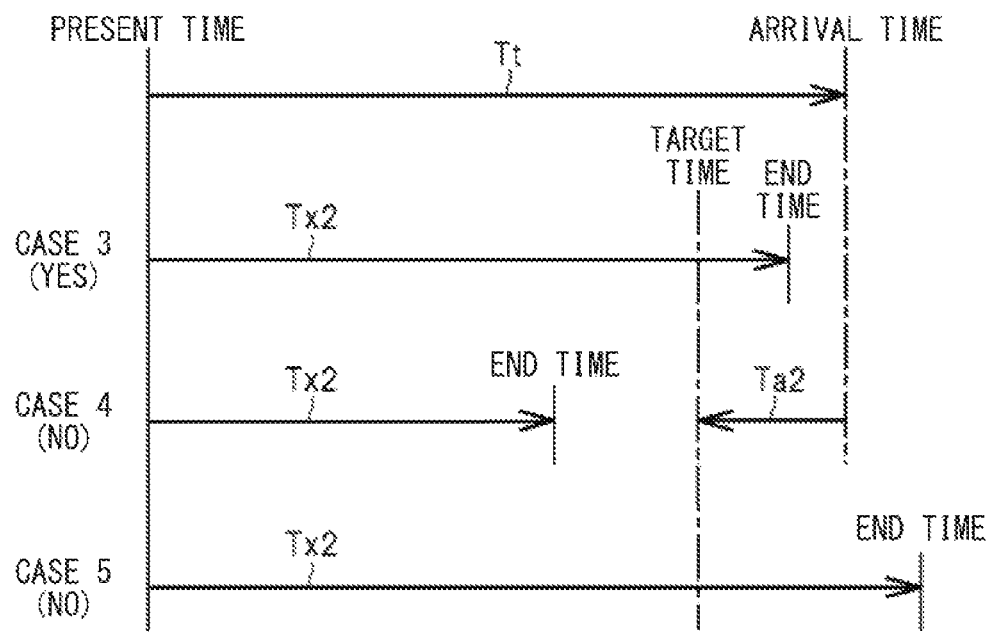
FIG. 16B is a diagram illustrating an exemplary execution status of the execution determination regarding the polarization eliminating mode B.

In the following, a determination as to whether a polarization eliminating mode B is to be executed is described first, following which the polarization eliminating mode B for eliminating the polarization is described. FIGS. 15A and 15B are flowcharts each illustrating an exemplary procedure for an examination determination regarding the polarization eliminating mode B. FIGS. 16A and 16B each illustrate an exemplary execution status of the execution determination regarding the polarization eliminating mode B. Note that the term "polarization eliminating mode B" may refer to a control mode in which the high-voltage battery 66 is stopped being charged or discharged to eliminate the polarization of the high-voltage battery 66.

The flowchart of FIG. 15A may be coupled to the flowchart of FIG. 15B at a portion B. Each step in the flowcharts of FIGS. 15A and 15B may indicate a process executed by one or more processors 100 in the control system 90. The execution determination illustrated in FIGS. 15A and 15B may be control executed by the control system 90 in a predetermined cycle after the driver operates the start switch 96 to start the control system 90, which includes the vehicle control unit CU8 and other components. That is, the execution determination illustrated in FIGS. 15A and 15B may be control executed by the control system 90 while the vehicle 11 is traveling.

As illustrated in FIG. 15A, the control system 90 may determine in Step S40 whether a destination has been set to the navigation system 40. If it is not determined in Step S40 that a destination has been set (Step S40: NO), the procedure may continue the process in Step S40. In contrast, if it is determined in Step S40 that a destination has been set (Step S40: YES), the procedure may proceed to Step S41. In Step S41, the control system 90 may acquire the scheduled travel distance D1 to the destination from the navigation system 40. Thereafter, the procedure may proceed to Step S42. In Step S42, the control system 90 may calculate a possible travel distance D3 of the vehicle 11 on the basis of the remaining energy amount of fuel. The control system 90 may calculate the remaining energy amount of fuel on the basis of a detection signal from the fuel level sensor 95 in a predetermined cycle. The control system 90 may also calculate the amount of energy consumption per unit of distance in a predetermined cycle. In Step S42, the control system 90 may calculate the possible travel distance D3 of the vehicle 11 on the basis of the remaining energy amount of fuel and the amount of energy consumption per unit of distance.

Thereafter, the procedure may proceed to Step S43. In Step S43, the control system 90 may determine whether the value calculated by subtracting the scheduled travel distance D1 from the possible travel distance D3 is greater than a predetermined threshold Da2. Case 11 illustrated in FIG. 16A corresponds to a case where the value calculated by subtracting the scheduled travel distance D1 from the possible travel distance D3 is determined to be greater than the threshold Da2 in Step S43 (Step S43: YES). In Case 11, the energy may remain even after the vehicle 11 travels the scheduled travel distance D1 to the destination and the polarization eliminating mode B is executed. Accordingly, it may be determined that the polarization eliminating mode B is able to be executed on the basis of the remaining energy amount, and the procedure may proceed to Step S44 in FIG. 15B. In Step S44, the control system 90 may continue the execution determination regarding the polarization eliminating mode B.

In contrast, Case 12 illustrated in FIG. 16A corresponds to a case where the value calculated by subtracting the scheduled travel distance D1 from the possible travel distance D3 is determined to be less than or equal to the threshold Da2 in Step S43 (Step S43: NO). In Case 12, it may be estimated that the remaining energy amount is insufficient to cause the vehicle 11 to travel the scheduled travel distance D1 to the set destination and execute the polarization eliminating mode B. Accordingly, it may be determined that the polarization eliminating mode B is difficult to be executed on the basis of the remaining energy amount, and the procedure may return to Step S41.

As illustrated in Step S44 of FIG. 15B, the control system 90 may set a time constant τ of the high-voltage battery 66 on the basis of the capacitor component Cr and the resistor component Rr of the high-voltage battery 66. Thereafter, the procedure may proceed to Step S45. In Step S45, the control system 90 may multiply the time constant τ by a predetermined coefficient k to set a polarization eliminating time Tx2 necessary for the polarization eliminating mode B. In one embodiment, the polarization eliminating time Tx2 may serve as the "first necessary time". Note that the polarization eliminating time Tx2 may be a time necessary to stop charging or discharging of the high-voltage battery 66 in order to eliminate the polarization of the high-voltage battery 66.

After Step S45 of FIG. 15B in which the polarization eliminating time Tx2 is set, the procedure may proceed to Step S46. In Step S46, the control system 90 may acquire the scheduled travel time Tt to the destination from the navigation system 40. In one embodiment, the scheduled travel time tT may serve as the "second necessary time". Thereafter, the procedure may proceed to Step S47. In Step S47, the control system 90 may determine whether the value calculated by subtracting the polarization eliminating time Tx2 from the scheduled travel time Tt is greater than or equal to zero and less than a predetermined threshold (herein also referred to as a predetermined time) Ta2. Case 13 illustrated in FIG. 16B corresponds to a case where the value calculated by subtracting the polarization eliminating time Tx2 from the scheduled travel time Tt is determined to be greater than or equal to zero and less than the predetermined threshold Ta2 in Step S47 (Step S47: YES). In Case 13, the end of the polarization eliminating time Tx2 is included within the predetermined time Ta2 prior to a time of arrival at the destination.

In this case, it may be estimated that the vehicle 11 will arrive at the destination without taking a long time after the end of the polarization eliminating mode B. That is, it may be estimated that the plug charging will start after the arrival at the destination without greatly charging or discharging the high-voltage battery 66 after the end of the polarization eliminating mode B. The procedure may thus proceed to Step S48. In Step S48, the control system 90 executes the polarization eliminating mode B while the vehicle 11 is traveling. Accordingly, it is possible to execute the polarization eliminating mode B at an appropriate timing even while the vehicle 11 is traveling.

In contrast, Case 14 illustrated in FIG. 16B corresponds to a case where the value calculated by subtracting the polarization eliminating time Tx2 from the scheduled travel time Tt is determined to be greater than or equal to the threshold Ta2 in Step S47 (Step S47: NO). In Case 14, the end of the polarization eliminating time Tx2 is not included within the predetermined time Ta2 prior to the time of arrival at the destination. In this case, the vehicle 11 can continue traveling even after the polarization eliminating mode B ends, which can generate polarization in the high-voltage battery 66 again. Accordingly, the control system 90 refrains from permitting the polarization eliminating mode B to be executed, and the procedure may return to Step S44. Thereafter, the determination may be made as to whether the execution of the polarization eliminating mode B is to be permitted.

Case 15 illustrated in FI. 16B corresponds to a case where the value calculated by subtracting the polarization eliminating time Tx2 from the scheduled travel time Tt is determined to be less than zero in Step S47 (Step S47: NO). In Case 15, the end of the polarization eliminating time Tx2 is not included within the predetermined time Ta2 prior to the time of arrival at the destination. In this case, it is difficult to end the polarization eliminating mode B before the vehicle 11 arrives at the destination. Accordingly, the control system 90 refrains from permitting the polarization eliminating mode B to be executed, and the procedure may return to Step S44. Thereafter, the determination may be made as to whether the execution of the polarization eliminating mode B is to be permitted.

In the above description, the polarization eliminating mode B is permitted to be executed while the vehicle 11 is traveling in a case where the value calculated by subtracting the polarization eliminating time Tx2 from the scheduled travel time Tt is greater than or equal to zero (0) and less than the threshold Tat, as illustrated in Step S47. However, this is a non-limiting example. For example, the polarization eliminating mode B may be permitted to be executed while the vehicle 11 is traveling in a case where the value calculated by subtracting the polarization eliminating time Tx2 from the scheduled travel time Tt is greater than or equal to zero (0). In other words, the polarization eliminating mode B may be permitted to be executed while the vehicle 11 is traveling in a case where the polarization eliminating time Tx2 is less than or equal to the scheduled travel time Tt. As described above, the control system 90 permits the polarization eliminating mode B to be executed while the vehicle 11 is traveling in a case where the polarization eliminating time Tx2 is less than or equal to the scheduled travel time Tt, whereas refrains from permitting the polarization eliminating mode B to be executed while the vehicle 11 is traveling in a case where the polarization eliminating time Tx2 is greater than the scheduled travel time Tt. Therefore, it is possible to execute the polarization eliminating mode B at an appropriate timing even while the vehicle 11 is traveling.

[Polarization Eliminating Mode B]

Figure 17:
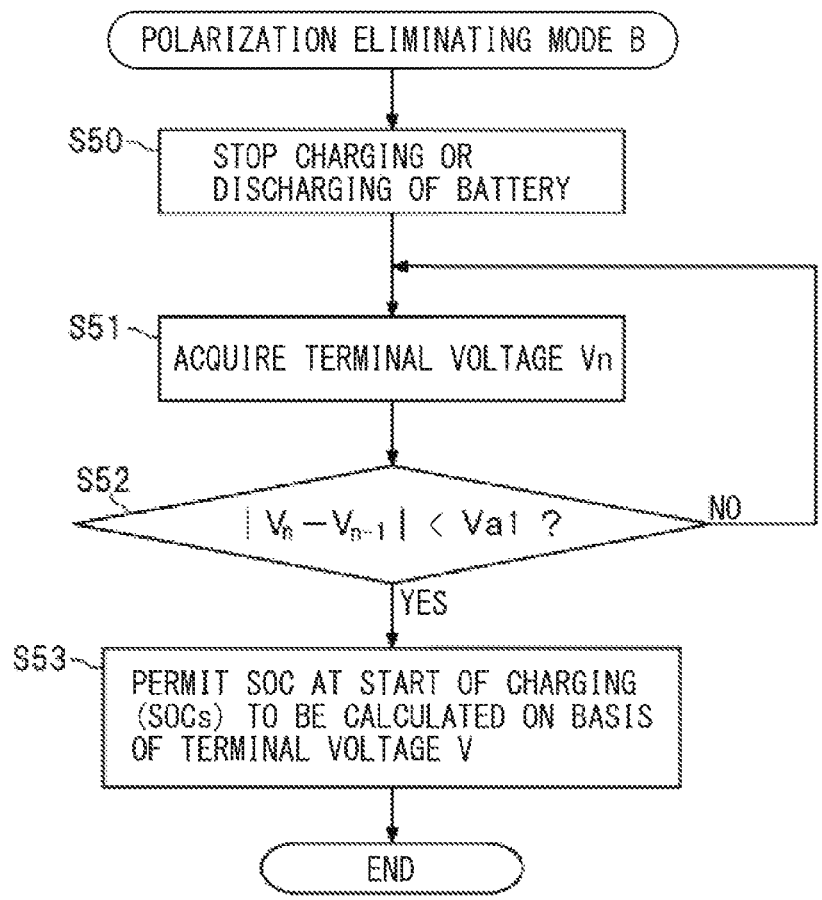
FIG. 17 is a flowchart illustrating an exemplary procedure for executing the polarization eliminating mode B.

In the following, an exemplary procedure for executing the polarization eliminating mode B in which the polarization of the high-voltage battery 66 is eliminated is described. FIG. 17 is a flowchart illustrating the exemplary procedure for executing the polarization eliminating mode B. Each step in the flowchart of FIG. 17 may indicate a process executed by one or more processors 100 in the control system 90. Note that the polarization eliminating mode B illustrated in FIG. 17 may correspond to the polarization eliminating mode executed in Step S48 of FIG. 15 described above, i.e., the polarization eliminating mode executed while the vehicle 11 is traveling.

As illustrated in Step S50 of FIG. 17, the control system 90 may stop charging and discharging of the high-voltage battery 66. Thereafter, the procedure may proceed to Step S51. In Step S51, the control system 90 may acquire a terminal voltage Vn of the high-voltage battery 66. Thereafter, the procedure may proceed to Step S52. In Step S52, the control system 90 may determine whether the absolute value of the difference between the terminal voltage Vn currently acquired and a terminal voltage Vn-1 previously acquired is less than a predetermined threshold Va1. The condition in which the absolute value of the difference between the terminal voltage Vn and the terminal voltage Vn-1 is be less than the threshold Va1 in Step S52 may correspond to the condition in which the polarization of the high-voltage battery 66 is eliminated and the amount of change in terminal voltage is reduced.

If it is determined in Step S52 that the absolute value of the difference between the terminal voltage Vn and the terminal voltage Vn-1 is less than the threshold Va1 (Step S52: YES), the control system 90 may determine that the polarization of the high-voltage battery 66 has been eliminated, and the procedure may proceed to Step S53. In contrast, if it is determined in Step S52 that the absolute value of the difference between the terminal voltage Vn and the terminal voltage Vn-1 is greater than or equal to the threshold Va1 (Step S52: NO), the procedure may return to Step S51. In Step S53, the terminal voltage V may approach the open circuit voltage OCV. Accordingly, the calculation of the SOCs in association with the SOH calculation processing at the time of the plug charging described above may be permitted. To stop energizing the high-voltage battery 66 in the polarization eliminating mode B, the main relay 68 of the battery module 62 may be interrupted, for example. Further, to stop charging and discharging of the high-voltage battery 66, the motor clutch 26 may be released to stop the motor generator 15 from rotating while the vehicle 11 is traveling.

Figure 18A:
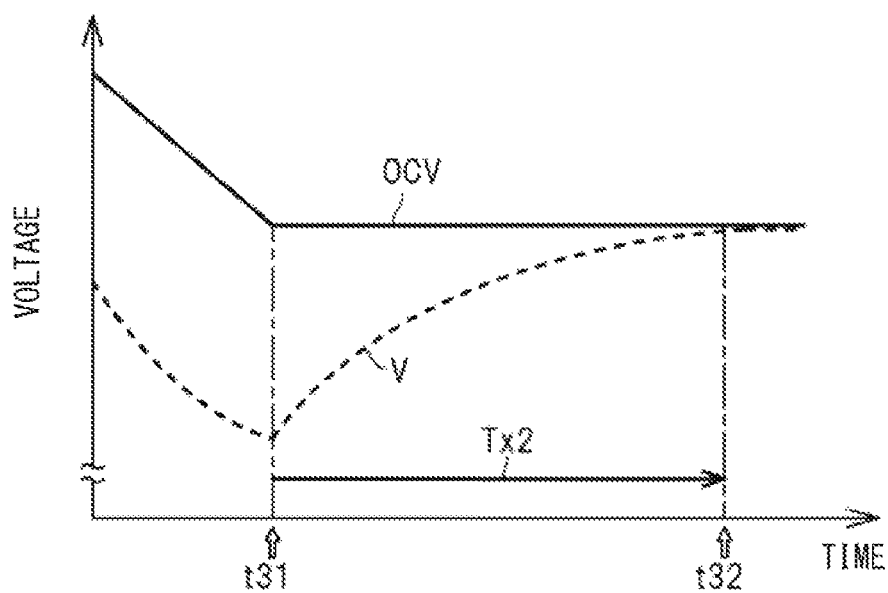
FIG. 18A is a diagram illustrating another exemplary execution status of the polarization eliminating mode B.
Figure 18B:
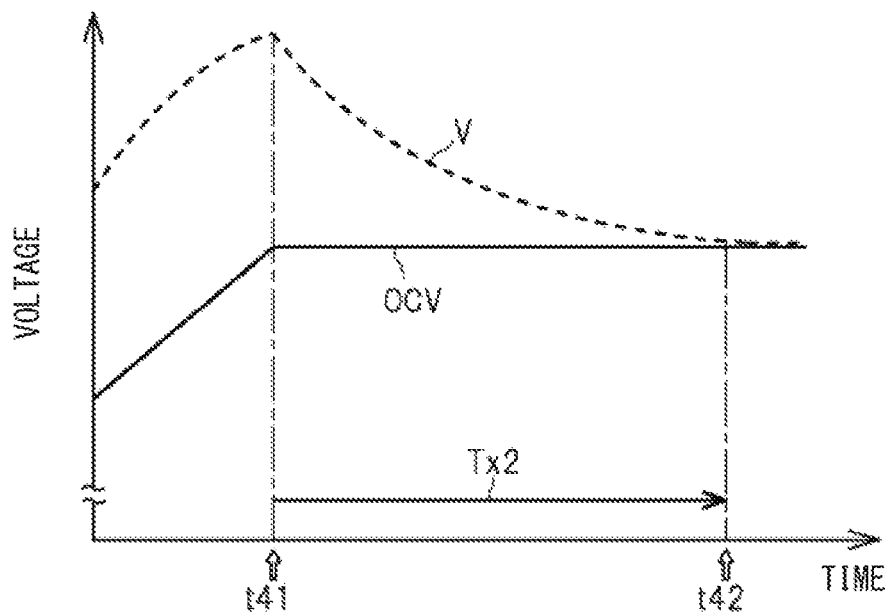
FIG. 18B is a diagram illustrating another exemplary execution status of the polarization eliminating mode B.

In the flowchart illustrated in FIG. 17, the polarization state of the high-voltage battery 66 may be determined on the basis of the transition of the terminal voltage. However, this is a non-limiting example. FIGS. 18A and 18B each illustrate another exemplary execution status of the polarization eliminating mode B. In a case where the high-voltage battery 66 is discharged before the execution of the polarization eliminating mode B as illustrated in FIG. 18A, the discharging of the high-voltage battery 66 may be stopped at a time t31 while the vehicle 11 is traveling. Thereafter, the energizing of the high-voltage battery 66 may continue to be stopped until a time t32 when the polarization eliminating time Tx2 ends. In a case where the energizing of the high-voltage battery 66 is stopped over the polarization eliminating time Tx2 as described above, the terminal voltage V may approach the open circuit voltage OCV. Accordingly, the calculation of the SOCs in association with the SOH calculation processing at the time of the plug charging described above may be permitted.

In contrast, in a case where the high-voltage battery 66 is charged before the execution of the polarization eliminating mode B as illustrated in FIG. 18B, the charging of the high-voltage battery 66 may be stopped at a time t41 while the vehicle 11 is traveling. Thereafter, the energizing of the high-voltage battery 66 may continue to be stopped until time a t42 when the polarization eliminating time Tx2 ends. In a case where the energizing of the high-voltage battery 66 is stopped over the polarization eliminating time Tx2 as described above, the terminal voltage V may approach the open circuit voltage OCV. Accordingly, the calculation of the SOCs in association with the SOH calculation processing at the time of the plug charging described above may be permitted.

It is to be appreciated that the technology should not be limited to the example embodiments described above, and may be modified in various ways without departing from the gist of the technology. Although the control system 90 may include the plurality of control units CU1 to CU8 in the above description, this is a non-limiting example. For example, the control system 90 may include a single control unit. In addition, although the power train 14 may include the continuously variable transmission mechanism 23 and the torque converter 25 in the above description, this is a non-limiting example. Alternatively, the power train 14 may have another configuration. Moreover, although the high-voltage battery 66 may be used as an electric power storage device in the above description, the terminal voltage of the high-voltage battery 66 should not be limited to a particular voltage. For example, a battery having a terminal voltage of several ten volts or a battery having a terminal voltage of several hundred volts may be used as an electric power storage device. Note that the high-voltage battery 66 may refer to a battery that has a terminal voltage higher than that of an auxiliary battery, such as a lead-acid battery (not illustrated). The terminal voltage of the auxiliary battery may be, for example, 12 V.

The vehicle control apparatus according to any of the example embodiments described above includes a control system configured to execute a polarization eliminating mode in which polarization of the electric power storage device is eliminated by controlling an energization state of the electric power storage device. The control system sets the first necessary time to eliminate the polarization on the basis of the polarization state of the electric power storage device, and acquires the second necessary time to the arrival of the vehicle to the destination. In a case where the first necessary time is shorter than or equal to the second necessary time, the polarization eliminating mode is permitted to be executed while the vehicle is traveling. Accordingly, it is possible to eliminate the polarization of the electric power storage device while the vehicle is traveling.

The control system 90 in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control system 90. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control system 90 illustrated in FIG. 2.

The invention claimed is:

1. A vehicle control apparatus comprising
a control system including a processor and a memory that are communicably coupled to each other, the control system being configured to execute a polarization eliminating mode in which polarization of an electric power storage device is eliminated by controlling an energization state of the electric power storage device while a vehicle is traveling, wherein
the control system is configured to
set a first necessary time to eliminate the polarization on a basis of a state of the polarization of the electric power storage device,
acquire a second necessary time to an arrival of the vehicle at a destination,
permit the polarization eliminating mode to be executed while the vehicle is traveling in a case where the first necessary time is shorter than or equal to the second necessary time, and
refrain from permitting the polarization eliminating mode to be executed while the vehicle is traveling in a case where the first necessary time is longer than the second necessary time.

2. The vehicle control apparatus according to claim 1, wherein the polarization eliminating mode comprises a control mode in which the electric power storage device is charged or discharged.

3. The vehicle control apparatus according to claim 2, wherein
the control system is configured to
permit the polarization eliminating mode to be executed while the vehicle is traveling in a case where an end of the first necessary time is included within a predetermined time prior to a time of arrival at the destination, and
refrain from permitting the polarization eliminating mode to be executed while the vehicle is traveling in a case where the end of the first necessary time is not included within the predetermined time prior to the time of arrival at the destination.

4. The vehicle control apparatus according to claim 3, further comprising an external charging system including an inlet to which an external power source is to be coupled in a detachable manner and an in-vehicle charger coupled to the electric power storage device, wherein
the control system is configured to
calculate a first state of charge of the electric power storage device before the electric power storage device is charged by the in-vehicle charger,
calculate a second state of charge of the electric power storage device after the electric power storage device is charged by the in-vehicle charger,
calculate an amount of charged electric power supplied from the in-vehicle charger to the electric power storage device in a case were the electric power storage device is charged by the in-vehicle charger, and
calculate a state of health of the electric power storage device on a basis of the first state of charge, the second state of charge, and the amount of charged electric power, the state of health comprising a capacity retention rate of the electric power storage device.

5. The vehicle control apparatus according to claim 2, further comprising an external charging system including an inlet to which an external power source is to be coupled in a detachable manner and an in-vehicle charger coupled to the electric power storage device, wherein
the control system is configured to
calculate a first state of charge of the electric power storage device before the electric power storage device is charged by the in-vehicle charger,
calculate a second state of charge of the electric power storage device after the electric power storage device is charged by the in-vehicle charger,
calculate an amount of charged electric power supplied from the in-vehicle charger to the electric power storage device in a case were the electric power storage device is charged by the in-vehicle charger, and
calculate a state of health of the electric power storage device on a basis of the first state of charge, the second state of charge, and the amount of charged electric power, the state of health comprising a capacity retention rate of the electric power storage device.

6. The vehicle control apparatus according to claim 1, wherein the polarization eliminating mode comprises a control mode in which charging and discharging of the electric power storage device are stopped.

7. The vehicle control apparatus according to claim 6, wherein
the control system is configured to
permit the polarization eliminating mode to be executed while the vehicle is traveling in a case where an end of the first necessary time is included within a predetermined time prior to a time of arrival at the destination, and
refrain from permitting the polarization eliminating mode to be executed while the vehicle is traveling in a case where the end of the first necessary time is not included within the predetermined time prior to the time of arrival at the destination.

8. The vehicle control apparatus according to claim 7, further comprising an external charging system including an inlet to which an external power source is to be coupled in a detachable manner and an in-vehicle charger coupled to the electric power storage device, wherein
the control system is configured to
calculate a first state of charge of the electric power storage device before the electric power storage device is charged by the in-vehicle charger,
calculate a second state of charge of the electric power storage device after the electric power storage device is charged by the in-vehicle charger,
calculate an amount of charged electric power supplied from the in-vehicle charger to the electric power storage device in a case were the electric power storage device is charged by the in-vehicle charger, and
calculate a state of health of the electric power storage device on a basis of the first state of charge, the second state of charge, and the amount of charged electric power, the state of health comprising a capacity retention rate of the electric power storage device.

9. The vehicle control apparatus according to claim 6, further comprising an external charging system including an inlet to which an external power source is to be coupled in a detachable manner and an in-vehicle charger coupled to the electric power storage device, wherein
the control system is configured to
calculate a first state of charge of the electric power storage device before the electric power storage device is charged by the in-vehicle charger,
calculate a second state of charge of the electric power storage device after the electric power storage device is charged by the in-vehicle charger,
calculate an amount of charged electric power supplied from the in-vehicle charger to the electric power storage device in a case were the electric power storage device is charged by the in-vehicle charger, and
calculate a state of health of the electric power storage device on a basis of the first state of charge, the second state of charge, and the amount of charged electric power, the state of health comprising a capacity retention rate of the electric power storage device.

10. The vehicle control apparatus according to claim 1, wherein
the control system is configured to
permit the polarization eliminating mode to be executed while the vehicle is traveling in a case where an end of the first necessary time is included within a predetermined time prior to a time of arrival at the destination, and
refrain from permitting the polarization eliminating mode to be executed while the vehicle is traveling in a case where the end of the first necessary time is not included within the predetermined time prior to the time of arrival at the destination.

11. The vehicle control apparatus according to claim 10, further comprising an external charging system including an inlet to which an external power source is to be coupled in a detachable manner and an in-vehicle charger coupled to the electric power storage device, wherein
the control system is configured to
calculate a first state of charge of the electric power storage device before the electric power storage device is charged by the in-vehicle charger,
calculate a second state of charge of the electric power storage device after the electric power storage device is charged by the in-vehicle charger,
calculate an amount of charged electric power supplied from the in-vehicle charger to the electric power storage device in a case were the electric power storage device is charged by the in-vehicle charger, and
calculate a state of health of the electric power storage device on a basis of the first state of charge, the second state of charge, and the amount of charged electric power, the state of health comprising a capacity retention rate of the electric power storage device.

12. The vehicle control apparatus according to claim 1, further comprising an external charging system including an inlet to which an external power source is to be coupled in a detachable manner and an in-vehicle charger coupled to the electric power storage device, wherein
the control system is configured to
calculate a first state of charge of the electric power storage device before the electric power storage device is charged by the in-vehicle charger,
calculate a second state of charge of the electric power storage device after the electric power storage device is charged by the in-vehicle charger,
calculate an amount of charged electric power supplied from the in-vehicle charger to the electric power storage device in a case were the electric power storage device is charged by the in-vehicle charger, and
calculate a state of health of the electric power storage device on a basis of the first state of charge, the second state of charge, and the amount of charged electric power, the state of health comprising a capacity retention rate of the electric power storage device.

13. A vehicle control apparatus comprising
circuitry configured to execute a polarization eliminating mode in which polarization of an electric power storage device is eliminated by controlling an energization state of the electric power storage device while a vehicle is traveling, wherein the circuitry is configured to
set a first necessary time to eliminate the polarization on a basis of a state of the polarization of the electric power storage device,
acquire a second necessary time to an arrival of the vehicle at a destination,
permit the polarization eliminating mode to be executed while the vehicle is traveling in a case where the first necessary time is shorter than or equal to the second necessary time, and
refrain from permitting the polarization eliminating mode to be executed while the vehicle is traveling in a case where the first necessary time is longer than the second necessary time.

\* \* \* \* \*